US012768287B2

(12) United States Patent
Potnuru et al.

(10) Patent No.: US 12,768,287 B2
(45) Date of Patent: Oct. 20, 2026

(54) BEARING ASSEMBLIES FOR A TURBOMACHINE

(71) Applicant: General Electric Company, Cincinnati, OH (US)

(72) Inventors: Santosh Kumar Potnuru, Bengaluru (IN); Pradeep Sangli, Bengaluru (IN); Ravindra Shankar Ganiger, Bengaluru (IN); Souvik Math, Bengaluru (IN); Duane Anstead, Fairfield, OH (US); Matthew D. Brothers, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/917,860

(22) Filed: Oct. 16, 2024

(65) Prior Publication Data

US 2025/0154879 A1 May 15, 2025

(30) Foreign Application Priority Data

Nov. 14, 2023 (IN) ............................. 202311077383

(51) Int. Cl.
*F01D 25/16* (2006.01)
*F01D 25/18* (2006.01)

(52) U.S. Cl.
CPC ........... *F01D 25/162* (2013.01); *F01D 25/18* (2013.01); *F05D 2240/50* (2013.01); *F05D 2260/98* (2013.01)

(58) Field of Classification Search
CPC ......... F01D 25/162; F01D 25/16; F01D 25/18
See application file for complete search history.

(56) References Cited

U.S. PATENT DOCUMENTS

| | | | |
|---|---|---|---|
| 4,245,951 A * | 1/1981 | Minnich ................ | F01D 9/065 415/173.7 |
| 5,749,660 A | 5/1998 | Dusserre-Telmon et al. | |
| 7,384,197 B2 | 6/2008 | Plona | |
| 7,665,897 B2 | 2/2010 | Alam et al. | |
| 8,979,383 B2 | 3/2015 | Carter et al. | |
| 9,033,581 B2 | 5/2015 | Carter et al. | |
| 9,194,433 B2 | 11/2015 | Qiu et al. | |
| 9,841,056 B2 | 12/2017 | Snow et al. | |
| 9,909,621 B2 | 3/2018 | Moratz | |
| 9,951,817 B2 | 4/2018 | Meyers | |

(Continued)

*Primary Examiner* — Ibrahime A Abraham
*Assistant Examiner* — John S Hunter, Jr.
(74) *Attorney, Agent, or Firm* — Venable LLP; Edward A. Kmett; Michele V. Frank

(57) ABSTRACT

Bearing assemblies for a turbomachine include a first race statically coupled to a fixed engine housing, a second race coupled to a rotating shaft, a bearing cage disposed between the first race and the second race, and at least one bearing element disposed in the bearing cage. The bearing cage can include inlet channels to allow air to flow into the bearing cage and outlet channels that allow the air and lubricant mixture in the bearing cage to vent into adjacent compartments of the turbomachine. During operation, the inlet channels actively direct an airflow into the bearing cage. In the bearing cage, the air mixes with lubricant, and the air and lubricant mixture is expelled from the bearing cage through the outlet channels, thereby reducing dwell time of lubricant in the bearing assembly.

7 Claims, 11 Drawing Sheets

(56) References Cited

U.S. PATENT DOCUMENTS

| | | | | |
|---|---|---|---|---|
| 10,480,582 | B2 | 11/2019 | Modrzejewski et al. | |
| 10,753,400 | B2 | 8/2020 | Duffy | |
| 2012/0260669 | A1 * | 10/2012 | Davis | F01D 25/164 60/797 |

* cited by examiner

BEARING ASSEMBLIES FOR A TURBOMACHINE

CROSS REFERENCE TO RELATED APPLICATION

This application claims the benefit of India Patent Application No. 202311077383, filed Nov. 14, 2023. The prior application is incorporated herein by reference in its entirety.

FIELD

The present disclosure relates to bearings for a turbomachine engine and cooling systems for the same.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to both the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a sump, or compartment, that holds a lubricant (e.g., oil) for lubricating the bearing assembly. This lubricant may also lubricate gears and other seals. Gaps between the housing and the rotor shaft permit rotation of the rotor shaft relative to the housing. A bearing sealing system usually includes two such gaps: one on the upstream end and another on the downstream end. In this respect, a seal disposed in each gap prevents the lubricant from escaping the sump that holds the lubricant. Further, the air around the sump may generally be at a higher pressure than the sump to reduce the amount of lubricant that leaks from the sump. Further, the one or more gaps and corresponding seals are generally positioned upstream and/or downstream of the sump to create the higher-pressure region surrounding the sump.

DETAILED DESCRIPTION

Figure 1:
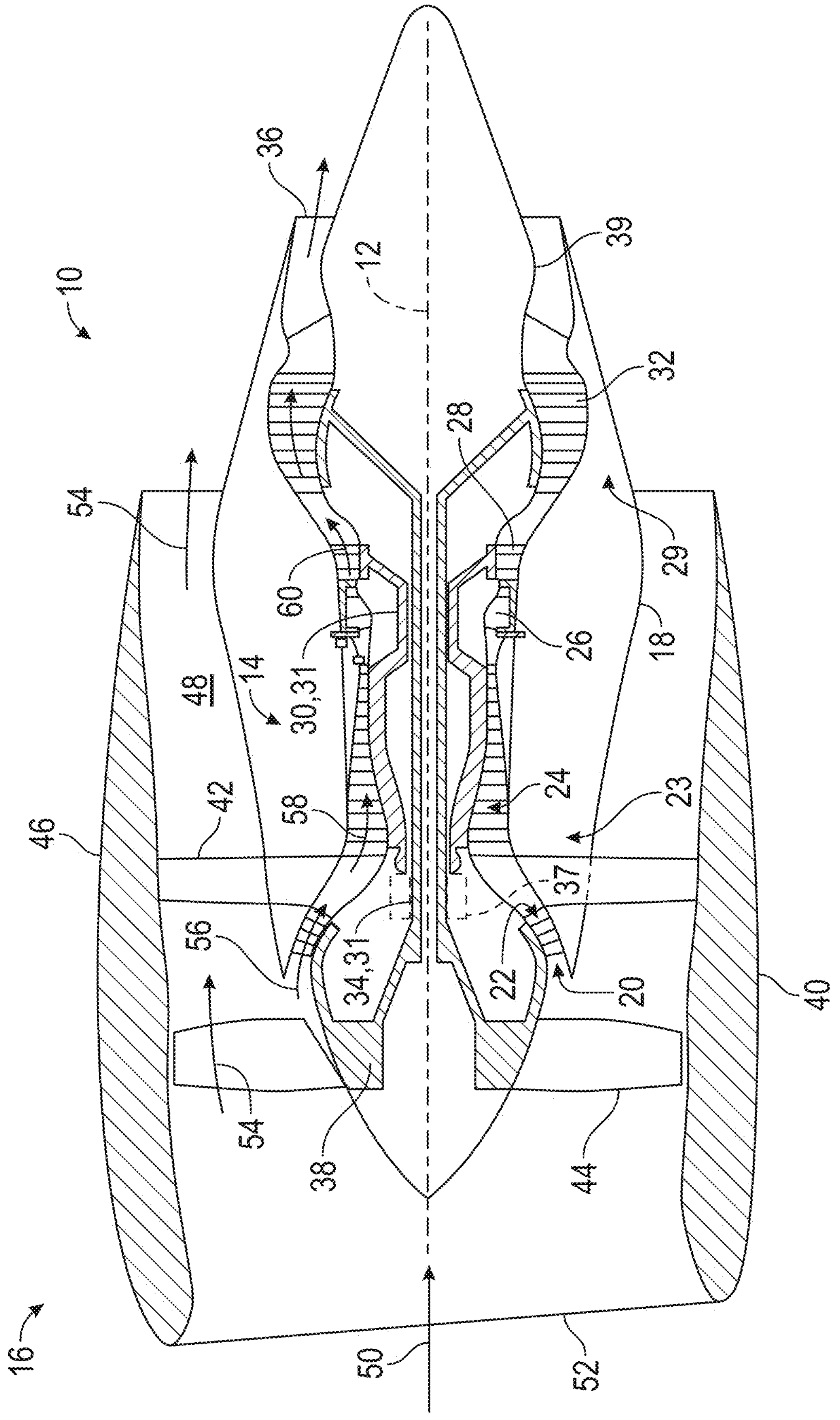
FIG. 1 illustrates a schematic side view of an example turbomachine engine.

Reference now will be made in detail to preferred embodiments, one or more examples of which are illustrated in the drawings. Each example is provided by way of explanation, not limitation of the preferred embodiments. In fact, it will be apparent to those skilled in the art that various modifications and variations can be made in the embodiments discussed without departing from the scope or spirit of disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "first" and "second", and may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Disclosed herein are examples of turbomachines and seal assemblies for use with turbomachines. The turbomachine may include a rotating shaft extending along a centerline axis and a fixed housing positioned exterior to the rotating shaft in a radial direction relative to the centerline axis. In some examples, the turbomachine can also include a rotating race disposed between the rotating shaft and the fixed engine housing. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a seal may be positioned between the rotating shaft and the pressurized housing to at least partially define the pressurized compartment to enclose the sump housing.

In certain examples, a seal assembly including a self-lubricating lattice material may allow for a more efficient turbomachine. A self-lubricating lattice material disposed between the rotating portions of a seal assembly and the static portions of the seal assembly can reduce the wear of the various seal assembly components that are in rotating contact with one another when the turbomachine is in an operational condition. Additionally, the use of a self-lubricating lattice material can mitigate heat buildup along the operational seal interface. In some examples, the self-lubricating lattice can be permeated with a lubricant and/or a coolant. For example, a self-lubricating lattice material can be deposited between a rotating race and a static sealing element so as to form a lubricant layer between the race and the sealing element when the turbomachine engine is operational.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high-pressure spool of a turbine engine, it should also be appreciated that the disclosed system and method can be used on any spool within a turbine engine, e.g., a low-pressure spool or an intermediate pressure spool.

Referring now to the drawings, FIG. 1 illustrates a cross-sectional view of one example of a turbomachine 10, also referred to herein as turbomachine engine 10. More particularly, FIG. 1 depicts the turbomachine 10 configured as a gas turbine engine that may be utilized within an aircraft in accordance with aspects of the present subject matter. The gas turbine engine is shown having a longitudinal or centerline axis 12, also referred to herein as a centerline, extending therethrough for reference purposes. In general, the engine may include a core engine 14 and a fan section 16 positioned upstream thereof. The core engine 14 may generally include a substantially tubular external housing 18 that defines an annular inlet 20. In addition, the external housing 18 may further enclose and support a compressor section 23. For the example show, the compressor section 23 includes a booster compressor 22 and a high-pressure compressor 24. The booster compressor 22 generally increases the pressure of the air that enters the core engine 14 to a first pressure level. The high-pressure compressor 24, such as a multi-stage, axial-flow compressor, may then receive the pressurized air from the booster compressor 22 and further increases the pressure of such air. The pressurized air exiting the high-pressure compressor 24 may then flow to a combustor 26 within which fuel is injected into the flow of pressurized air, with the resulting mixture being combusted within the combustor 26.

For the example illustrated, the external housing 18 may further enclose and support a turbine section 29. Further, for the depicted example, the turbine section 29 includes a first, high-pressure turbine 28 and second, low-pressure turbine 32. For the illustrated examples, one or more of the compressors 22, 24 may be drivingly coupled to one or more of the turbines 28, 32 via a rotating shaft 31 extending along the centerline axis 12. For example, high energy combustion products 60 are directed from the combustor 26 along the hot gas path of the engine to the high-pressure turbine 28 for driving the high-pressure compressor 24 via a first, high-pressure drive shaft 30. Subsequently, the combustion products 60 may be directed to the low-pressure turbine 32 for driving the booster compressor 22 and fan section 16 via a second, low-pressure drive shaft 34 generally coaxial with high-pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline axis 12 and positioned exterior to the rotating shaft 31 in a radial direction relative to the centerline axis 12.

Additionally, as shown in FIG. 1, the fan section 16 of the engine may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several examples, the low-pressure drive shaft 34 may be directly coupled to the fan rotor assembly 38 to provide a direct-drive configuration. Alternatively, the low-pressure drive shaft 34 may be coupled to the fan rotor assembly 38 via a speed reduction device 37 (e.g., a reduction gear or gearbox or a transmission) to provide an indirect-drive or geared drive configuration. Such a speed reduction device(s) 37 may also be provided between any other suitable shafts and/or spools within the turbomachine engine 10 as desired or required.

During operation of the turbomachine engine 10, it should be appreciated that an initial airflow (indicated in FIG. 1 by arrow 50) may enter the turbomachine engine 10 through an associated inlet 52 of the fan casing 40. For the illustrated example, the airflow then passes through the fan blades 44 and splits into a first compressed airflow (indicated by arrow 54) that moves through the by-pass airflow conduit 48 and a second compressed airflow (indicated by arrow 56) which enters the booster compressor 22. In the depicted example, the pressure of the second compressed airflow 56 is then increased and enters the high-pressure compressor 24 (as indicated by arrow 58). After mixing with fuel and being combusted within the combustor 26, the combustion products 60 may exit the combustor 26 and flow through the high-pressure turbine 28. Thereafter, for the shown example, the combustion products 60 flow through the low-pressure turbine 32 and exit the exhaust nozzle 36 to provide thrust for the engine.

Figure 2:
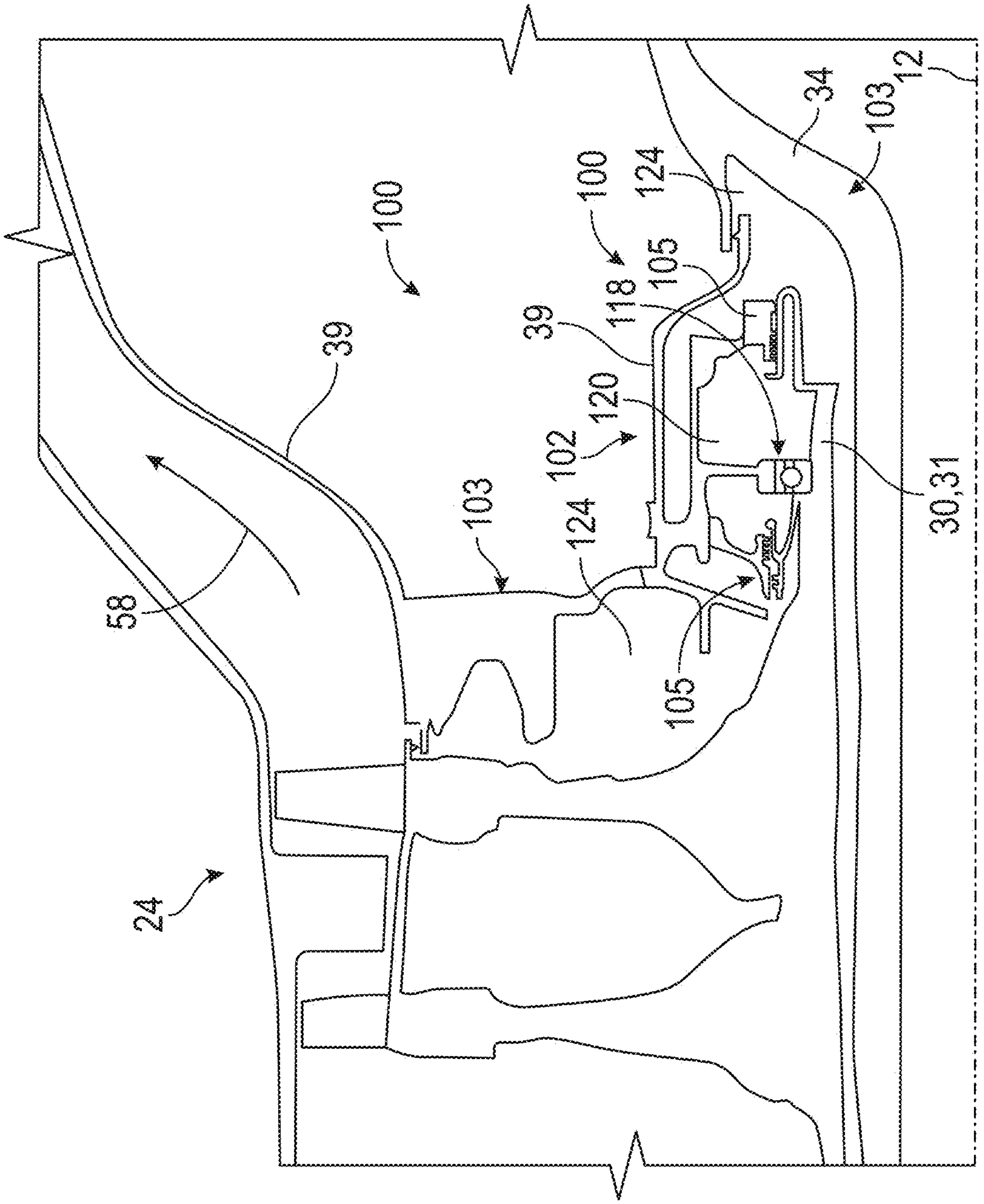
FIG. 2 illustrates a schematic side view of a section of a turbomachine engine including an example of a seal assembly.

Turning now to FIG. 2, the turbomachine engine 10 can include a seal assembly 100, positioned between stationary and rotating components of the turbomachine engine 10. For example, the seal assembly 100 can be positioned between stationary and rotating components of the high-pressure compressor 24 described above.

The seal assembly 100 may generally isolate a sump housing 102 from the rest of the turbomachine engine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components parts may be coupled to the fixed housing 39 or formed integrally with the fixed housing 39. Similarly, the rotating shaft 31 may also include various intermediary components extending from the rotating shaft 31 to form the sump housing. Further, the sump housing 102 at least partially defines a bearing compartment 120 for holding a cooling lubricant (not shown). For instance, the sump housing 102 at least partially radially encloses the cooling lubricant and a bearing assembly 118 (as described in more detail in relation to FIG. 3A). The cooling lubricant (e.g., oil) for lubricating the various components of the bearing assembly 118 may circulate through the bearing compartment 120. The seal assembly 100 may include one or more sump seals 105 (as described in more detail in reference to FIGS. 3A and 3B) at least partially defining the bearing compartment 120 for holding the cooling lubricant.

The seal assembly 100 further includes a pressurized housing 103 positioned exterior to the sump housing 102. The pressurized housing 103 may at least partially enclose the sump housing 102. For example, as illustrated, the pressurized housing 103 may be positioned both forward and aft relative to the centerline axis 12 of the turbomachine engine 10. The pressurized housing 103 may include at least a portion of the rotating shaft 31 and the fixed housing 39 or intermediary components extending from the rotating shaft 31 and/or the fixed housing 39. For example, the pressurized housing 103 may be formed at least partially by the high-pressure drive shaft 30 and the fixed housing 39 both forward and aft of the sump housing 102.

For the depicted example, the pressurized housing 103 defines a pressurized compartment 124 to at least partially enclose the sump housing 102. In the exemplary example, bleed air from the compressor section 23 (FIG. 1), the turbine section 29 (FIG. 1), and/or the fan section 16 (FIG. 1) may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal(s) 105.

Further, the seal assembly 100 may include one or more seals to further partially define the pressurized compartment 124. For instance, one or more sealing elements may be positioned between the rotating shaft 31 and the fixed housing 39.

Figure 3A:
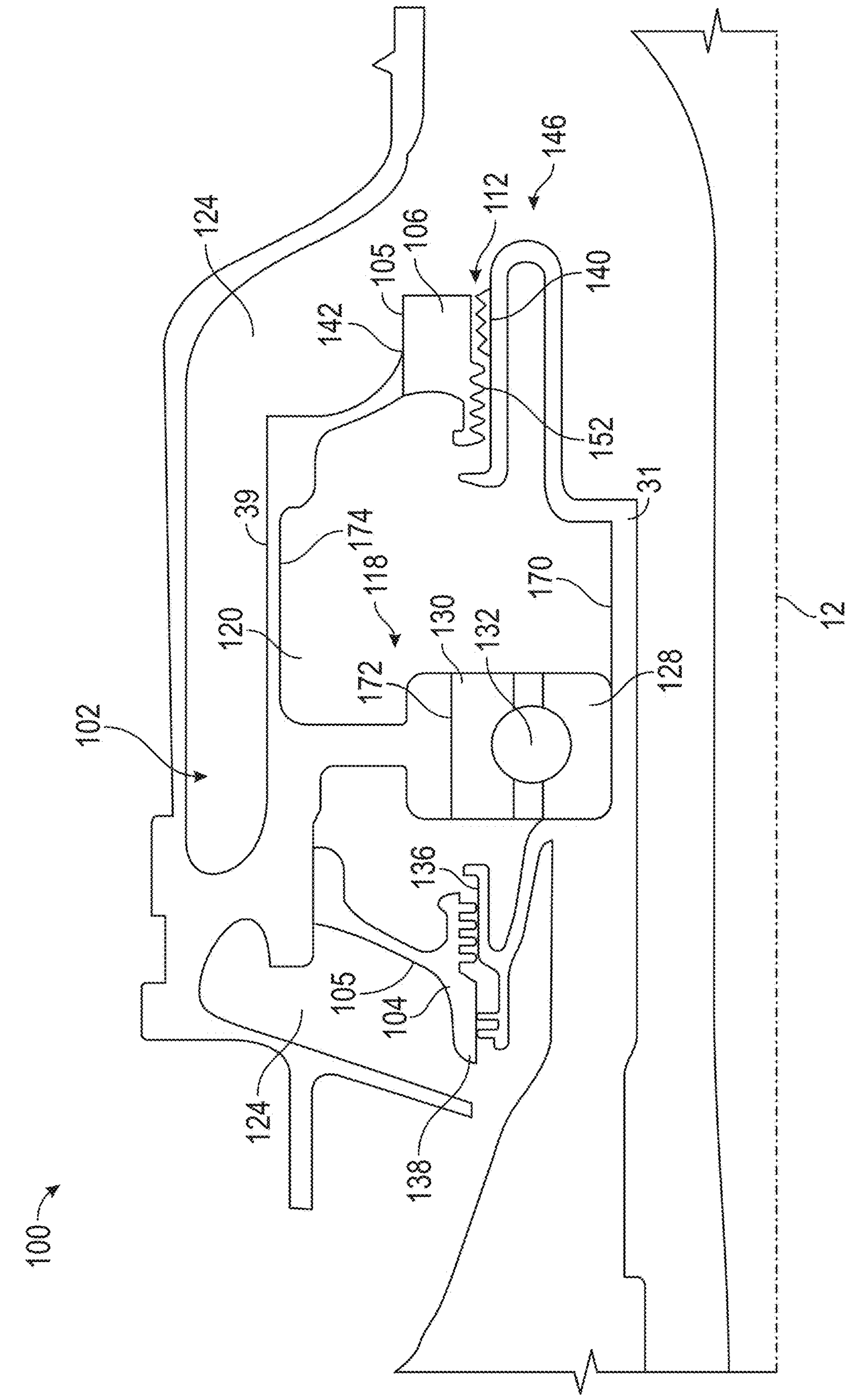
FIG. 3A illustrates an enlarged view of the seal assembly depicted in FIG. 2.

Referring now to FIG. 3A, a closer view of the sump housing 102 is illustrated according to aspects of the present disclosure. In the illustrated example, the seal assembly may include two sump seals 105, also referred to herein as first and second sump seals 105. Each of a first and second sump seals 105 may be positioned between the rotating shaft 31 and the fixed housing 39 to at least partially define the bearing compartment 120 for housing the cooling lubricant and the bearing assembly 118. For example, the first sump seal 105 may be positioned forward of the bearing assembly 118, and the second sump seal 105 may be positioned aft of the bearing assembly 118. For the illustrated example, the first sump seal 105 may be a labyrinth seal 104, and the second sump seal 105 may be a carbon seal 106. The two sump seals 105 may be any suitable type of seal, and, in other examples, the sealing system may include further sump seals 105, such as three or more. For example, in other examples, multiple labyrinth seals, carbon seals, and/or hydrodynamic seals may be utilized in the sump housing 102 in any arrangement.

FIG. 3A also more closely illustrates the labyrinth seal 104 and the carbon seal 106. For the example depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other examples, one or both of the sump seals 105 may be contact seal. Each type of seal may operate in a different manner. For the depicted example, the labyrinth seal 104 includes an inner surface 136 (coupled to the rotating shaft 31) and an outer surface 138 (coupled to the fixed housing 39). For example, a tortuous path (not shown) extending between the inner and outer surfaces 136, 138 prevents the cooling lubricant from escaping the sump housing 102. For the exemplary example shown, the air pressure on an outer side of the labyrinth seal 104 (i.e., in the pressurized compartment 124) is greater than the air pressure on the inner side of the labyrinth seal 104 (i.e., in the bearing compartment 120). In this respect, the stationary and rotating components may be separated by an air film (sometimes called an air gap) during relative rotation therebetween.

The carbon seal 106 may, in some examples, be a hydrodynamic or non-contacting seal with one or more hydrodynamic grooves 140 positioned between the stationary and rotating components, as illustrated in FIG. 3A. In general, the hydrodynamic grooves 140 may act as pump to create an air film between the non-contacting carbon seal 106 and the rotating shaft 31. For example, as the rotating shaft 31 rotates, fluid shear may direct air in a radial gap 112 into the hydrodynamic groove(s) 140. As air is directed into the hydrodynamic grooves 140, the air may be compressed until it exits the hydrodynamic groove(s) 140 and forms the air film to separate the rotating shaft 31 and the non-contacting carbon seal 106. The air film may define the radial gap 112 between the stationary and non-stationary components of the seal assembly 100, as shown in FIG. 3A. Thus, the rotating shaft 31 may ride on the air film instead of contacting the carbon seal 106.

In some examples, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, a portion of the carbon seal 106 lifts off of the rotating shaft 31 and/or the hairpin member 146 when the rotating shaft 31 rotates at sufficient speeds.

Figure 3B:
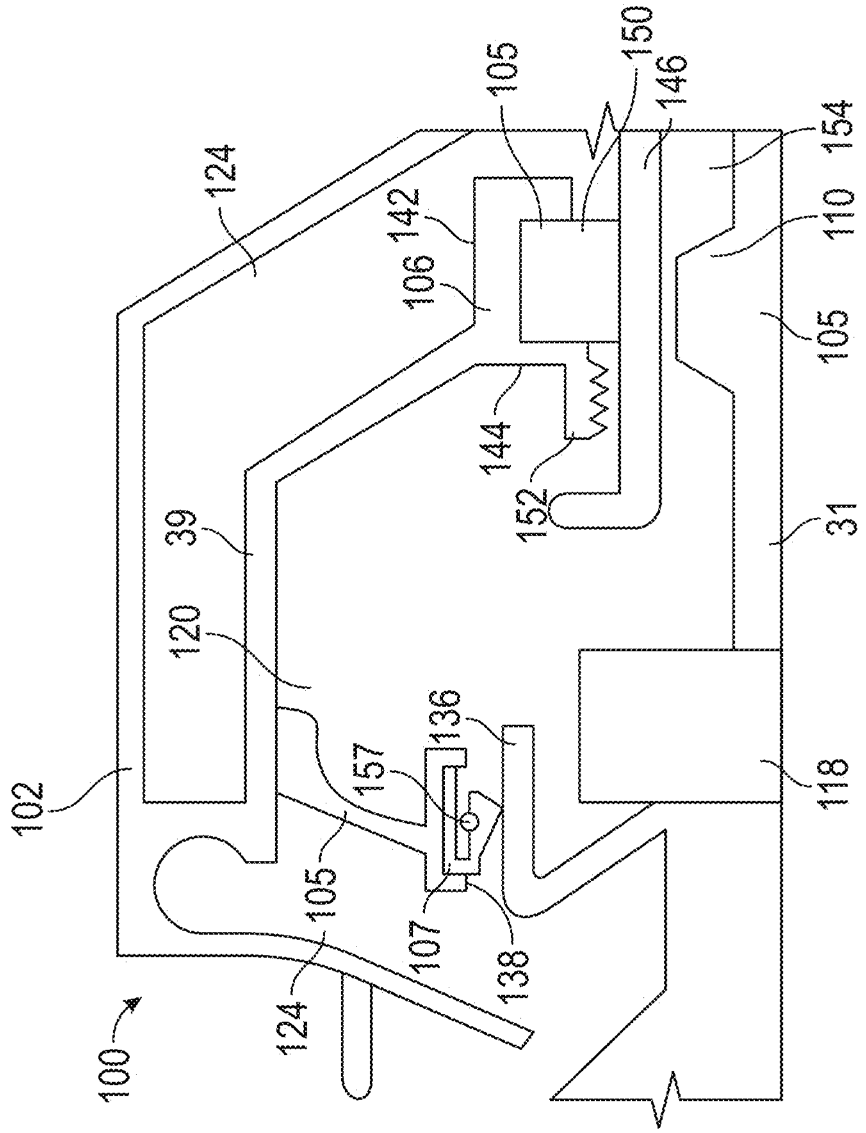
FIG. 3B illustrates a schematic side view of a section of a turbomachine engine including a contact seal assembly.

Referring now to FIG. 3B, a sump housing 102 of a seal assembly 100 is illustrated according to another aspect of the present disclosure. It should be noted that the description of the seal assembly 100 of FIG. 3A applies to like parts of the seal assembly 100 of FIG. 3B unless otherwise noted, and accordingly like parts will be identified with like numerals.

The sump housing 102 of FIG. 3B particularly illustrates the sump housing 102 with three sump seals 105. The sump housing 102 may generally be configured as the sump housing 102 of FIG. 3A. For example, the sump housing 102 may include a portion of the rotating shaft 31, a portion of the fixed housing 39, and enclose the bearing assembly 118. Further, the sump seals 105 and the sump housing 102 at least partially define the bearing compartment 120.

In the example illustrated, one of the sump seals 105 is a contacting lip seal 107. As such, the inner surface 136 and the outer surface 138 may be in contact in order to seal the sump housing 102. Further, a spring 157 may be in compression between the outer surface 138 and the fixed housing 39 to maintain contact between the inner and outer surfaces 136, 138. The illustrated example further includes a carbon seal 106 configured as a contacting carbon seal. As such, the carbon seal 106 includes a carbon element 150 in sealing engagement with the rotating shaft 31. For the example depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further examples, one of the sump seals 105 may be a brush seal. In such examples, the brush seal may contain a plurality of bristles (such as carbon bristles) in sealing engagement between the rotating shaft 31 and the fixed housing 39.

Returning to FIG. 3A, the seal assembly 100 also includes the bearing assembly 118. The bearing assembly 118 may be in contact with an exterior surface 170 of the rotating shaft 31 and an interior surface 172 of the fixed housing 39. It should be recognized that the rotating shaft 31 may be the high-pressure drive shaft 30 or the low-pressure drive shaft 34 described in regard to FIG. 1 or any other rotating drive shaft of the turbomachine 10. The bearing assembly 118 may be positioned radially between the portion of the rotating shaft 31 and the portion of the fixed housing 39 that form the sump housing 102. As such, the bearing assembly 118 may be positioned within the sump housing 102. The bearing assembly 118 may support the rotating shaft 31 relative to various fixed components in the turbomachine engine 10 (FIG. 1).

In the depicted example, the bearing assembly 118 may be a thrust bearing. That is, the bearing assembly 118 may support the rotating shaft 31 from loads in the axial, or the axial and radial directions relative to the centerline axis 12. For example, the bearing assembly 118 may include an inner race 128, also referred to herein as a first race, extending circumferentially around the exterior surface 170 of the rotating shaft 31. In the shown example, an outer race 130, also referred to herein as a second race, is disposed radially outward from the inner race 128 and mates with the fixed housing 39, such as an interior surface 174 of the sump housing 102. The inner race 128 and the outer race 130 may have a split race configuration. For the depicted example, the inner race 128 and the outer race 130 may sandwich at least one bearing element 132 therebetween. Preferably, the inner race 128 and the outer race 130 sandwich at least three bearing elements 132 therebetween.

In additional examples, the bearing assembly 118 may be a radial bearing. That is, the bearing assembly 118 may support the rotating shaft 31 from loads generally in the radial direction relative to the centerline axis 12. In other examples, the inner race 128 and outer race 130 may sandwich at least one cylinder, cone, or other shaped element to form the bearing assembly 118.

Figure 4:
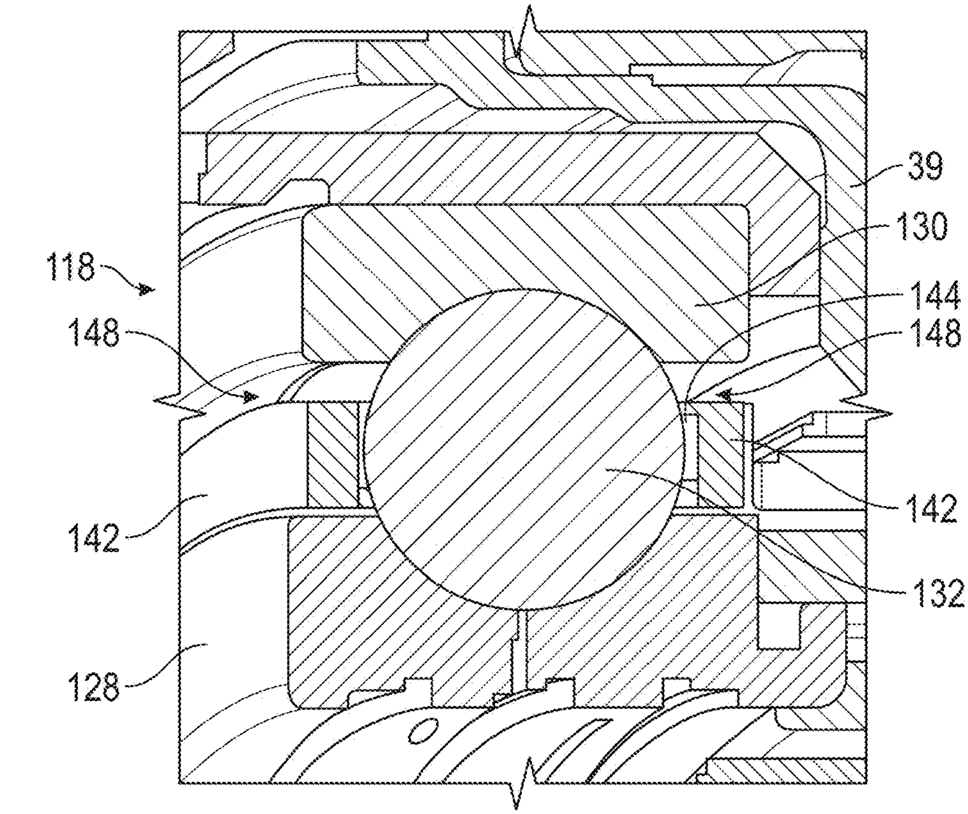
FIG. 4 is a cutaway section view of a rotary bearing assembly according to one example.

The bearing assembly 118, shown in greater detail in FIG. 4, also comprises a bearing cage 142 having an annular body and disposed between the inner race 128 and the outer race 130. The bearing cage 142 can be include one or more bearing slots 144 that receive the at least one bearing element 132 and retains the at least one bearing element 132 between the inner race 128 and the outer race 130 of the bearing assembly 118. In examples where the at least one bearing element 132 comprises more than one bearing elements 132, the bearing cage 142 keeps each bearing element 132 spaced circumferentially apart from one another. Thus, when the engine is in an operational state, the rotation of the rotating shaft 31 (shown in FIG. 3A with the inner race 128 coupled to the rotating shaft 31) causes the components of the bearing assembly 118 to rotate relative to one another.

Specifically, the inner race 128, which is statically coupled to the rotating shaft 31, rotates at the same rotational speed as the rotating shaft 31. In some examples, the outer race 130 can be directly coupled to the fixed housing 39 and can remain stationary relative to the fixed housing 39. In other examples, the outer race 130 can be an inter-shaft bearing, and can rotate relative to the fixed housing 39 in the same direction as the inner race 128, but at a different rotational speed. The bearing cage 142 and the at least one bearing element 132 rotate between the inner race 128 and the outer race 130, typically at a rotational speed that is less than the rotational speed of the inner race 128 and the rotating shaft 31. The relative motion of the components of the bearing assembly 118 causes friction, particularly between the at least one bearing element 132 and the bearing cage 142, the inner race 128, and the outer race 130.

To reduce the operational friction of the bearing assembly 118 and to remove heat generated by friction while the turbomachine engine 10 (FIG. 1) is in the operational state, lubricant is added to the bearing assembly 118. In some examples, the lubricant can be added to the bearing assembly 118 via a forced flow (i.e., a lubricant jet or an under-race on the bearing assembly 118).

The bearing assembly 118 can also comprise a radial gap 148 between the bearing cage 142 and one of the races 128, 130. The radial gap 148 provides a fluid pathway between the bearing assembly 118, particularly the at least one bearing element 132 and the bearing slots 144, and the bearing compartment 120. As shown in FIG. 4, the radial gap 148 can be positioned between the bearing cage 142 and the outer race 130, but it is to be understood that a radial gap 148 positioned between the bearing cage 142 and the inner race 128 can serve substantially the same purpose.

Because the components of the engine bearing rotate at high speeds relative to one another during the operation of the turbomachine engine 10 (FIG. 1), heat generation and mechanical wear can arise. Generated heat is dissipated to support engine operation and to avoid burning off lubricants during engine operation, as well as to prevent thermal expansion of the bearing components. Additionally, wear of the engine components can cause a decrease in operational performance over time. Minimizing the wear of the engine components can increase the time an engine may operate before needing repair and maintenance. This problem is particularly acute at higher shaft/rotor speeds when the greater relative rotational speeds of the bearing components generate more heat. Both challenges may be addressed by reducing the amount of heat generated during the operation of the turbomachine engine, for example by lubricating the bearing to reduce the friction between the components, in turn reducing the amount of heat that must be dissipated. Additionally, the bearing can be cooled by the introduction of a cooling fluid, such as a lubricant mixture (which may also function as a lubricant), to the bearing.

Cooling engine bearings with a lubricant mixture poses several challenges, however. The lubricant may be an effective coolant only for a short time after it has been added to the bearing, and thereafter may be too warm to effectively remove more heat from the bearing components. Additionally, this problem cannot necessarily be addressed by adding more lubricant/coolant to the bearing. The bearing cage has a limited volume, and while the addition of more lubricant to the bearing cage provides additional thermal mass to remove heat from the bearing compartment, it may also increase the generation of heat due to viscous heat generation (i.e., heat generated from forcing newly-added lubricant past the lubricant already in the bearing cage). As such, there is a limit to how much additional cooling can be achieved by introducing more lubricant to the bearing assembly. Furthermore, the more lubricant added to the bearing assembly requires increasing the size of other components of the turbomachine engine, such as the lubricant lines, lubricant pumps, and heat exchangers.

FIGS. 5 through 8 illustrate various aspects of example bearing cages that may be employed in a bearing assembly, similar to bearing cage 142 of bearing assembly 118, as described in greater detail above in FIGS. 3A and 4. The bearing cages of FIGS. 5-8 include a plurality of aeration inlet channels to force lubricant out of the bearing cage through a plurality of lubricant outlets. By actively introducing air into the bearing cage, the lubricant can be forced through the outlets at higher speed. This, in turn, reduces the residence time of the lubricant in the bearing cage, allowing a greater quantity of lubricant to pass through the bearing assembly without causing a corresponding increase in viscous heating of the bearing assembly and/or the lubricant.

Figure 5:
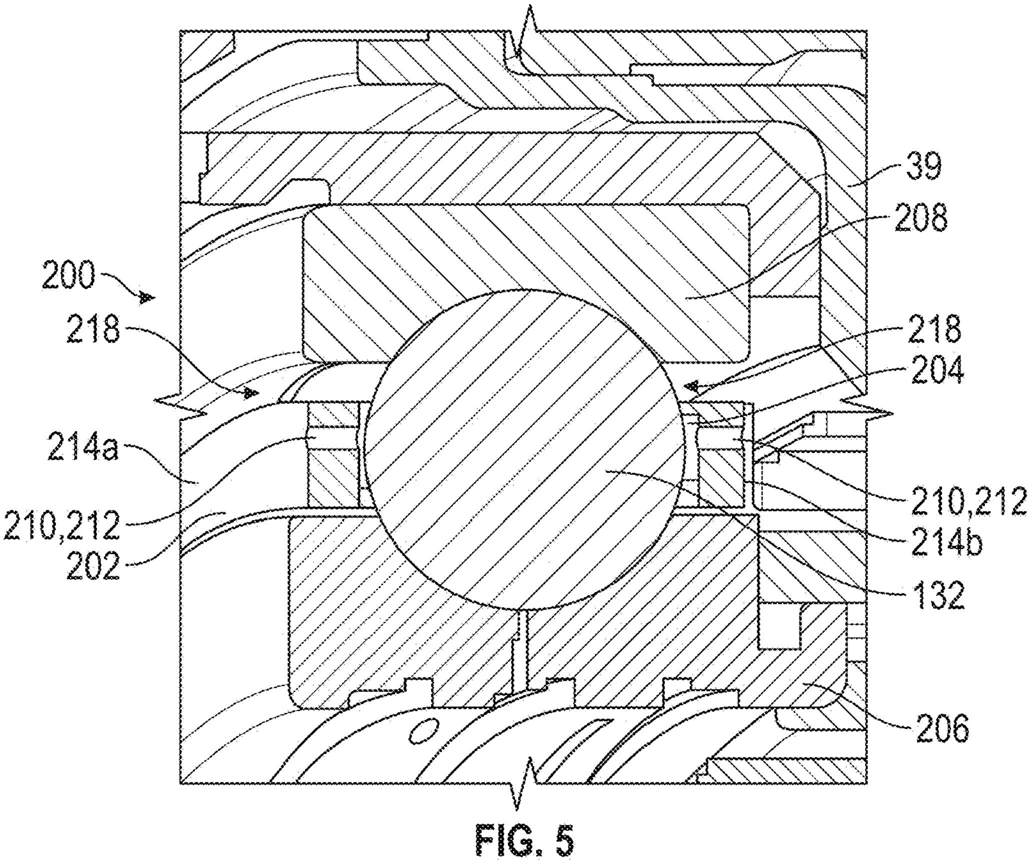
FIG. 5 is a cutaway section view of a rotary bearing assembly according to another example including inlet and outlet channels.

FIG. 5 shows a bearing assembly 200 with an air-driven lubricant exchange according to one example. The bearing assembly 200 comprises a bearing cage 202 having an annular body with a first axial end portion **214*a*, a second axial end portion 214*b*, a longitudinal axis parallel to the centerline axis of the turbomachine engine (such as centerline axis 12 of turbomachine engine 10), and one or more bearing slots 204. The one or more bearing slots 204 receive one or more bearing elements, such as bearing elements 132, described in greater detail above regarding bearing assembly 118 (as illustrated in FIGS. 3A and 4). The bearing cage 202 and the bearing elements 132 sit between an inner race 206, also referred to herein as a first race, and an outer race 208, also referred to herein as a second race, as described above in relation to the bearing assembly 118, with the bearing elements 132 in simultaneous contact with the inner race 206 and the outer race 208**.

The outer race 208 can be coupled to the fixed engine housing 39 or disposed between the fixed engine housing 39 and the inner race 206. The inner race 206 can be statically coupled to the rotating shaft 31 (FIG. 3A). When the turbomachine engine 10 (FIG. 1) is in an operational state, the rotating shaft 31 and the inner race 206 rotate together, and the bearing cage 202 moves along with the inner race 206 (for example, in the direction indicated by arrow A in FIGS. 6A through 6C). In examples with an outer race 208 statically coupled to the fixed engine housing 39, the outer race 208 remains stationary relative to the fixed engine housing 39. In other examples (for instance, when the bearing assembly 200 is an inter-shaft bearing), the outer race 208 can rotate relative to the fixed engine housing 39 in the same rotational direction as the inner race 206, but at a different rotational velocity. As described in greater detail above, lubricant is introduced to the bearing cage 202 from the bearing compartment 120 (FIG. 3A), and provides lubrication between the bearing elements 132, the inner race 206, the bearing cage 202, and the outer race 208.

The bearing assembly 200 can also include a radial gap 218 between the bearing cage 202 and either the inner race 206 or the outer race 208. For example, as shown in FIG. 5, the radial gap 218 can be positioned between the bearing cage 202 and the outer race 208, such that the bearing cage 202 is adjacent to and rotates along the inner race 206. In this way, the bearing slots 204 can be opened to the chambers of the turbomachine engine 10 (FIG. 1) (such as the bearing compartment 120, shown in FIG. 3A), allowing lubricant to exit the bearing assembly 200 through the radial gap 218. While FIG. 5 shows the radial gap 218 disposed between the bearing cage 202 and the outer race 208, it is to be understood that the radial gap 218 may also be positioned between the bearing cage 202 and the inner race 206, such that the bearing cage 202 is adjacent to and rotates along the outer race 208.

Figure 6C:
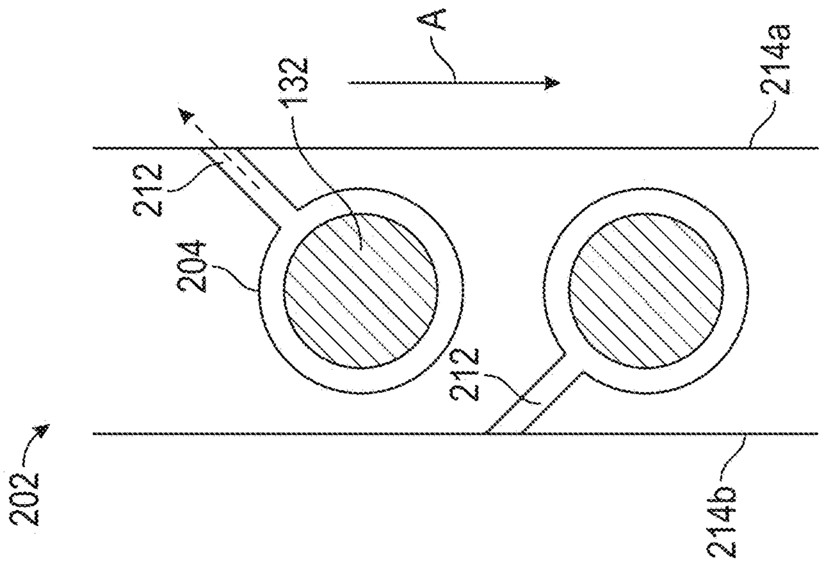
FIG. 6C is a top schematic view of a race for a rotary bearing assembly with an alternative configuration of outlet channels.
Figure 6B:
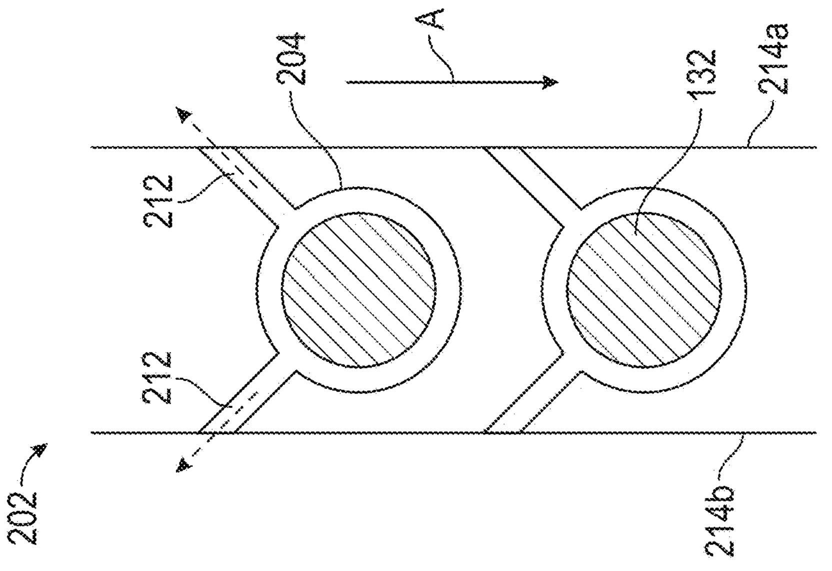
FIG. 6B is a top schematic view of a race for a rotary bearing assembly with an alternative configuration of outlet channels.
Figure 6A:
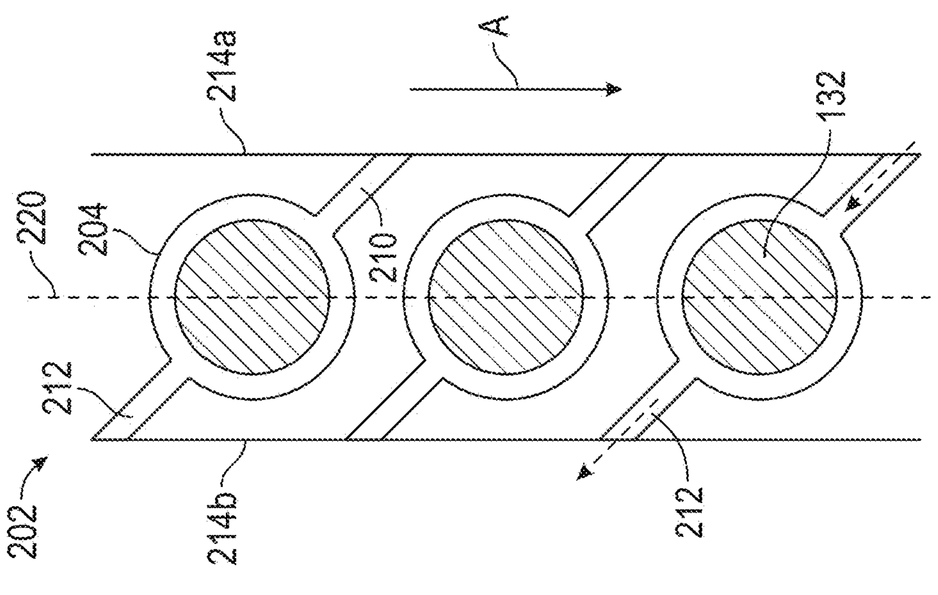
FIG. 6A is a top schematic view of a bearing cage for a rotary bearing assembly according to one example having inlet and outlet channels.

The bearing cage 202 can further comprise a plurality of inlet channels 210, also referred to herein as first channels having a lubricant inlet, and a plurality of outlet channels 212, also referred to herein as second channels having a lubricant outlet, to decrease lubricant dwell time and increase lubricant flow rate through the bearing assembly 200. As best shown in FIG. 6A, the inlet channels 210 and the outlet channels 212 generally extend from the axial end portions **214*a*, 214*b* of the bearing cage 202 towards an axial centerline 220 of the bearing cage 202 along which the bearing slots 204 are located, allowing for fluid communication between the bearing compartment 120 (FIG. 3A) and the portions of the bearing assembly 200 (FIG. 5) disposed axially inwards from the first axial end portions 214*a*, such as the bearing slots 204 and the bearing elements 132**.

In one example illustrated in FIG. 6A, the inlet channels 210 can extend between the bearing slots 204 towards the first axial end portion **214*a* of the bearing cage 202. The inlet channels 210 can be angled or swept forward (i.e., the portions of the inlet channels along the first axial end portion 214*a* can be further forward in the direction of rotation of the bearing assembly 200 (FIG. 5), as indicated by arrow A, than the portions of the inlet channels adjacent the bearing slots 204) in a rotational direction. The outlet channels 212 can extend from the bearing slots 204 towards a second axial end portion 214***b* of the bearing cage 202. In some examples, the outlet channels can be angled or swept backward (i.e., the portions of the outlet channels 212 along the second axial end portion 214*b* can be further backward in the direction of rotation of the bearing assembly 200 (FIG. 5), as indicated by arrow A, than the portions of the outlet channels 212 adjacent the bearing slots 204). In such examples, the orientation of the inlet channels 210 and the outlet channels 212 can improve the flow of air into the bearing cage 202 and the flow of an air and lubricant mixture out of the bearing cage 202.

In particular, as the bearing cage 202 moves in the direction indicated by the arrow A, the forward-swept air inlet channels 210 function like air scoops, pushing air from the first axial end portion 214*a* of the bearing cage 202 (i.e., from the bearing compartment 120 illustrated in FIG. 3A) towards each respective slot 204. On reaching the bearing slot 204, the air can mix with the lubricant already present within the bearing slot 204, creating an air-lubricant mixture around the bearing elements 132. The air-lubricant mixture will absorb heat from the bearing elements 132 and the adjacent components of the bearing assembly 200, such as the bearing cage 202, the inner race 206 and the outer race 208. As the air-lubricant mixture absorbs heat from the components of the bearing assembly 200, the continual intake of air through the inlet channels 210 will force the air lubricant mixture away from the bearing slots 204 through each corresponding outlet channel 212.

Because the outlet channels 212 are swept backwards, and because the inlet channels 210 provide an inflow of air into the bearing assembly 200 (FIG. 5), the outlet channels 212 will not draw significant quantities of air in from the adjacent engine compartments (i.e., the bearing compartment 120 shown in FIG. 3A). This ensures a unidirectional flow of air into the bearing assembly 200 and a flow of an air and lubricant mixture out of the bearing assembly 200. The flow of air into the bearing slots 204 of the bearing cage 202 causes turbulence in the bearing slots 204, which mixes the air and the lubricant. Because the lubricant is being continually mixed with the airflow through the inlet channels 210 and outlet channels 212 and the bearing slots 204, rather than resting in the bearing slot 204, the residence time of the lubricant within the bearing cage 202, particularly within the bearing slots 204, is reduced. In turn, this reduces the viscous heating of the lubricant, reduces the potential for lubricant burnoff, and improves the ability of the bearing assembly 200 to change heated lubricant out for cooler lubricant, thereby improving the ability to cool the bearing components such as the bearing cage 202, the races 206, 208, and the bearing elements 132.

While FIG. 6A shows a bearing cage 202 having inlet channels 210 and outlet channels 212 disposed on opposite axial ends of the bearing cage 202 (i.e., the inlet channels 210 extending from the first axial end portion 214*a* towards the axial centerline of the bearing cage 202 and the outlet channels 212 extending from the second axial end portion 214*b* towards the axial centerline of the bearing cage 202), it is to be understood that in other examples, the inlet channels 210 and outlet channels 212 may extend from the same axial end portion 214*a*, 214*b* of the bearing cage 202 towards the axial centerline of the bearing cage 202. It is also to be understood that, while FIG. 6A shows a bearing cage 202 having an equal number of inlet channels 210 and outlet channels 212 arranged in pairs of corresponding inlet and outlet channels 210, 212, it is to be understood that the number of inlet and outlet channels 210, 212 can be varied to achieve a desired air inflow and/or lubricant and air outflow rate, such that the bearing cage 202 can have a different number of inlet channels 210 and outlet channels 212.

As shown in FIG. 6A, the number of the inlet channels 210 can equal the number of the outlet channels 212, and both the inlet channels 210 and the outlet channels can be circumferentially spaced apart from one another along the bearing cage 202. It is to be appreciated, however, that other configurations, such as those illustrated in FIGS. 6B through 6C are possible. For example, FIG. 6B shows a bearing assembly 200 with pairs of outlet channels 212 extending from the axially central portions of the bearing cage 202 to opposite axial end portions 214*a*, 214*b*, while FIG. 6C shows a bearing cage 202 with outlet channels 212 spaced circumferentially apart from one another and extending from the axially central portions of the bearing cage 202 to alternating axial end portions 214*a*, 214*b* of the bearing cage 202. It is to be understood that in some examples, the outlet channels 212 need not extend to alternating axial end portions 214*a*, 214*b* of the bearing cage 202, and that a portion of the outlet channels 212 can extend to the first axial end portion 214*a*, and the remaining portion of the outlet channels 212 can extend to the second axial end portion 214*b* without pattern.

Figure 7:
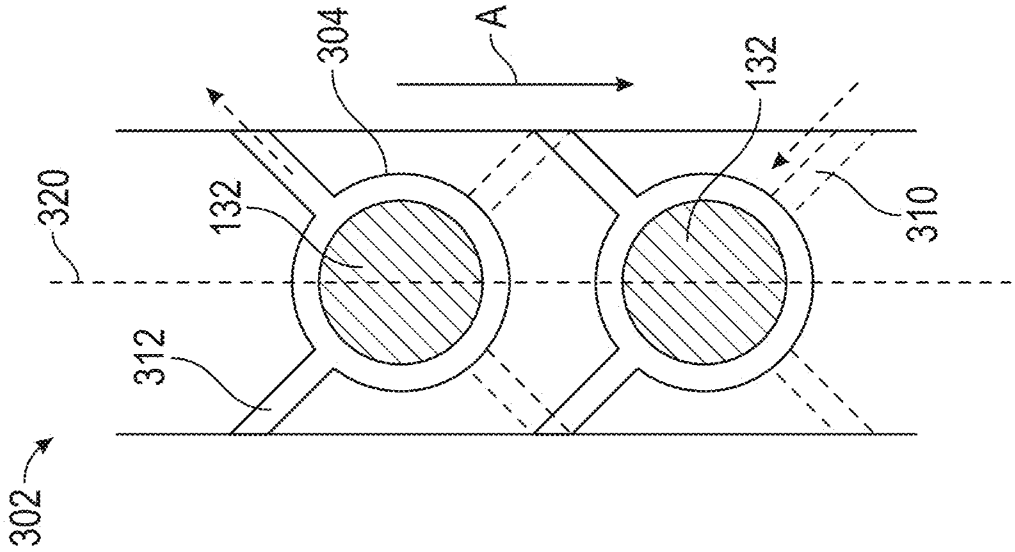
FIG. 7 is a top schematic view of a race for a rotary bearing assembly according to another example, having inlet channels on an inner surface and outlet channels on an outer surface.

In other examples, the bearing assembly can include a bearing cage with the inlet channels spaced radially apart from the outlet channels. For example, FIG. 7 shows a bearing cage 302 with an annular body comprising a plurality of slots 304 that receive ball bearings, such as bearing elements 132 described in greater detail above. As previously described in relation to bearing assembly 200, the bearing cage 302 can be disposed between an inner race and an outer race (as shown in FIG. 5 for bearing assembly 200). The bearing assembly can function in a substantially identical way to the bearing assembly 200, previously described, except for the differences described below.

Figure 8:
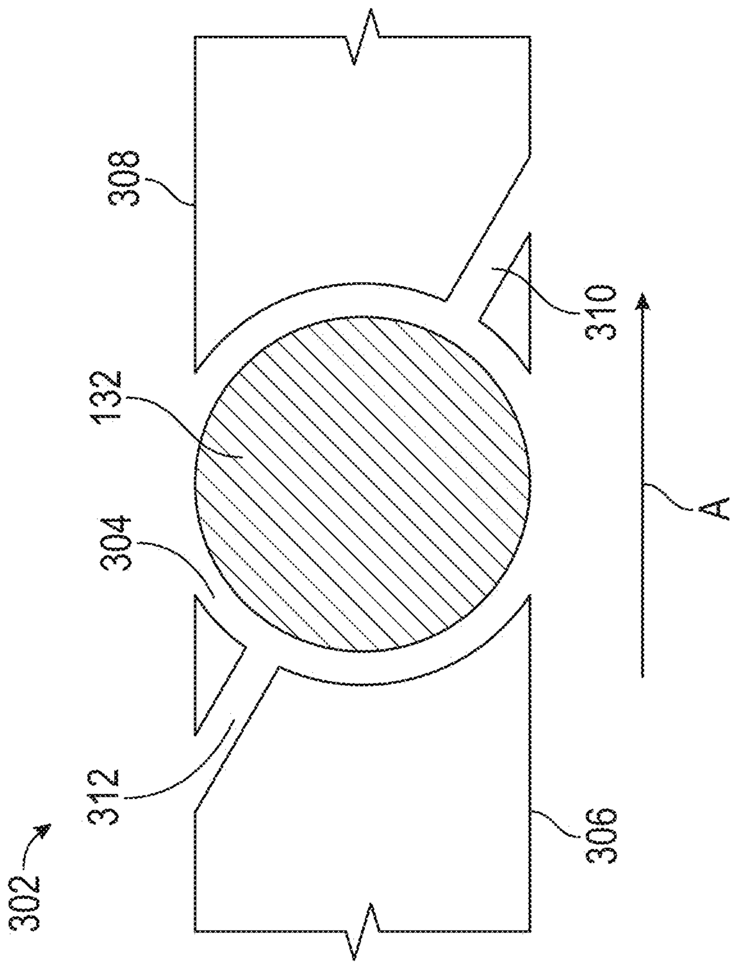
FIG. 8 is a schematic cross-sectional view of the race of FIG. 7.

As shown in FIG. 8, the bearing cage 302 can have a radially inward face 306 and a radially outward face 308. The bearing cage 302 can also comprise a plurality of inlet channels 310, extending radially outwards from a region located at or near the radially inward face 306 to a corresponding slot 304 that contains a bearing element 132 (such as a ball bearing or roller bearing). The bearing cage 302 can also comprise a plurality of outlet channels 312 extending from the bearing slots 304 to the radially outward face 308 of the bearing cage.

As shown in FIG. 7, the inlet channels 310 can be swept forward and the outlet channels 312 can be swept backwards to ensure a unidirectional flow of air from the inlet channels 310 through the bearing slots 304 and out through the outlet channels 312. Because the inlet channels 310 and the outlet channels 312 are spaced radially apart on the bearing cage 302, and because air flows from the inlet channels 310 through the bearing slot 304 to the outlet channels 312, for the same reasons discussed above with respect to the bearing assembly 200, this configuration of the bearing cage ensures that the air-lubricant mixture will be expelled from the bearing cage 302 radially outwards and away from the rotating shaft 31 (FIG. 3A).

In the examples previously discussed, each of the inlet channels 210, 310 and the outlet channels 212, 312 may be aligned at an angle relative to a centerline axis 220, 320 of the respective bearing cage 202, 302 along the direction indicated by arrow A in FIGS. 6A-8, where a 0° angle would represent a channel parallel to the direction of travel, and an angle of 90° would represent a channel perpendicular to the direction of travel. In the examples previously discussed, the angle of each of the inlet channels 210, 310 and the outlet channels 212, 312 relative to the centerline axis 220, 320 is typically between 10° and 80°. In specific examples, the angle between each of the inlet channels 210, 310 and the outlet channels 212, 312 and the centerline axis 220, 320 can be between 30° and 60°. Such bearing assembly designs can reduce the heat buildup caused by viscous heating of the lubricant in the bearing assembly by at least 20%. In one example, the addition of inlet and outlet channels to the bearing cage of the bearing assembly resulted in a reduction in viscous heat generation of 43%.

While FIGS. 6A-8 show inlet channels 210, 310 and outlet channels 212, 312 having a uniform cross section and a straight geometry, it is to be understood that in some examples, other configurations of the inlet channels 210, 310 and outlet channels 212, 312 may be used. For instance, the inlet channels 210, 310 and outlet channels 212, 312 may have a cross-section that varies along the length in some examples. In other examples, the inlet channels 210, 310 and outlet channels 212, 312 can be curved along the lengths of the channels. In some examples, the inlet and/or outlet ends of the inlet channels 210, 310 and outlet channels 212, 312 may be counter-sunk.

Figure 9A:
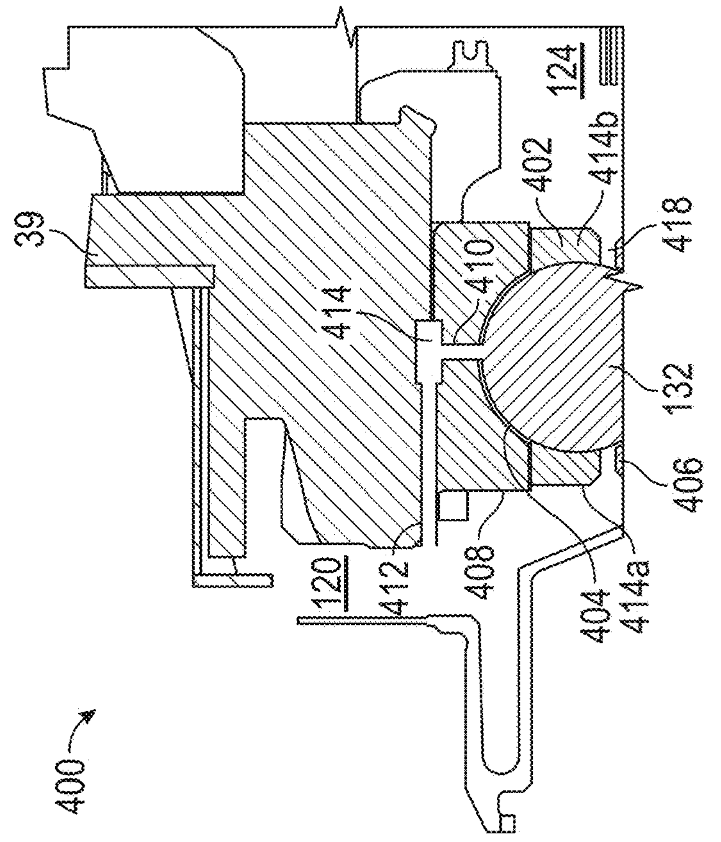
FIG. 9A is a cutaway section view of a rotary bearing assembly according to another example, including radial and axial outlet channels.
Figure 9B:
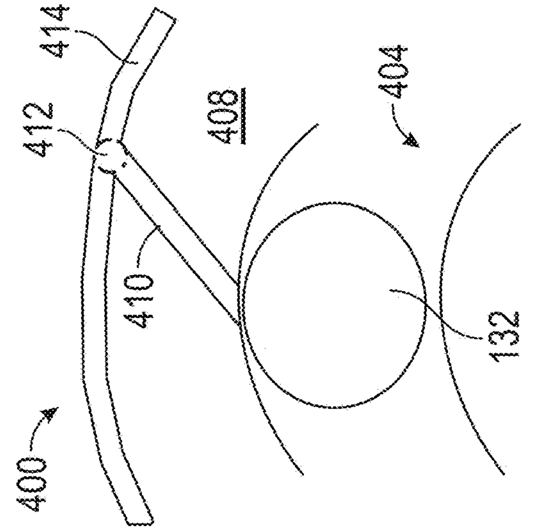
FIG. 9B is a schematic of the axial-view direction of the rotary bearing assembly of FIG. 9A.
Figure 9C:
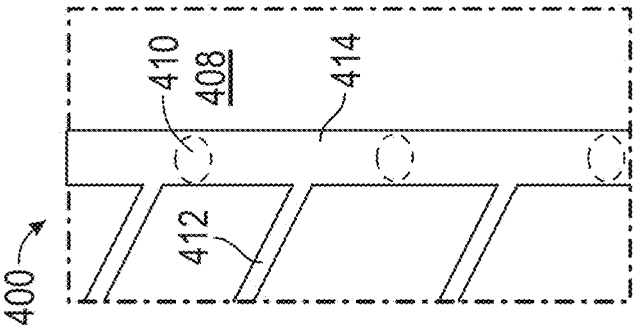
FIG. 9C is a schematic of the radial-view direction of the rotary bearing assembly of FIG. 9A.

FIGS. 9A-9C show an example bearing assembly 400. The bearing assembly 400 can be identical or substantially identical to the bearing assembly 200 described herein and illustrated in FIG. 5, aside from the differences described herein. The bearing assembly 400 can function in an identical or substantially identical fashion as described above with respect to bearing assembly 200, aside from the differences described herein.

As shown in FIG. 9A, the bearing assembly 400 comprises an annular bearing cage 402 having an annular body with a first axial end portion 414*a*, a second axial end portion 414*b*, a longitudinal axis parallel to the centerline axis of the turbomachine engine (such as centerline axis 12 of turbomachine engine 10), and one or more bearing slots 404. The one or more bearing slots 404 receive one or more bearing elements, such as bearing elements 132, described in greater detail above regarding bearing assembly 118 (and as illustrated in FIGS. 3A and 4). The bearing cage 402 and the bearing elements 132 sit between an inner race 406, also referred to herein as a first race, and an outer race 408, also referred to herein as a second race, as described above in relation to the bearing assembly 118, with the bearing elements 132 in simultaneous contact with the inner race 406 and the outer race 408.

The outer race 408 can be coupled to the fixed engine housing 39 or disposed between the fixed engine housing 39 and the inner race 406. The inner race 406 can be statically coupled to the rotating shaft 31 (as shown in FIG. 3A). As described in greater detail above, lubricant is introduced to the bearing cage 402 from the bearing compartment 120 (FIG. 3A), and provides lubrication between the bearing elements 132, the inner race 406, the bearing cage 402, and the outer race 408.

The bearing assembly 400 can also include a radial gap 418 between the bearing cage 402 and either the inner race 406 or the outer race 408. For example, as shown in FIG. 9A, the radial gap 418 can be positioned between the bearing cage 402 and the inner race 406, such that the bearing cage 402 is adjacent to and rotates along the inner race 406. In this way, the bearing slots 404 can be opened to the chambers of the turbomachine engine 10 (FIG. 1) (such as the bearing compartment 120, shown in FIG. 3A), allowing lubricant to exit the bearing assembly 400 through the radial gap 418. While FIG. 9A shows the radial gap 418 disposed between the bearing cage 402 and the inner race 406, it is to be understood that the radial gap 418 may alternatively be positioned between the bearing cage 402 and the outer race 408, such that the bearing cage 402 is adjacent to and rotates along the outer race 408.

As shown in FIG. 9A, the outer race 408 can further comprise a radial channel 410. As also shown in FIG. 9A, the fixed engine housing 39 can comprise a radial channel 412 and an annular groove 414 disposed between and connecting the axial channel 412 to the radial channel 410. The channels 410, 412 comprise a lubricant outlet, which decreases lubricant dwell time and increases lubricant flow rate through the bearing assembly 400.

The radial channels 410 can extend radially outwards from the bearing slot 404 and terminate at the annular groove 414. The annular groove 414 extends circumferentially around the full circumference of the outer race 408. The axial channels 412 extend from the annular groove 414 to the bearing compartment 120.

Because air can flow into the bearing slot 404 through the radial gap 418, for the same reasons discussed above with respect to the bearing assembly 200, this configuration of the bearing assembly 400 ensures that the air-lubricant mixture will be expelled radially from the bearing cage 402 and into the radial channels 410. As the air-lubricant mixture is expelled through the radial channels 410, it flows radially toward the annular groove 414, spreads circumferentially into the annular groove 414, and flows axially through the axial channels 412 and into the bearing compartment 120. Thus, heated lubricant can be returned to the bearing compartment 120 and/or the pressurized compartment 124 from the bearing cage 402.

In some examples, such as that shown in FIG. 9B, the radial channel 410 can have a circumferential slant (that is, the radial channel 410 can extend in a circumferential direction as well as in a radial direction). In such examples, the circumferential slant may facilitate the flow of the air-lubricant mixture as it is centrifugally expelled from the bearing slot 404.

As illustrated in FIG. 9C, the bearing assembly 400 can, in some examples, have more than one radial channel 410 and/or more than one axial channel 412 in fluid communication with the annular groove 414. As shown in FIG. 9C, the multiple axial channels 412 and the multiple radial channels 410 can be circumferentially spaced apart from one another, for example to form a distribution of radial channels 410 in the outer race 408 (for example, a plurality of evenly spaced radial channels 410) and a distribution of axial channels 412 in the fixed engine housing 39 (FIG. 9A) (for example, a plurality of evenly spaced axial channels 412). Advantageously, this both increases flow of the air-lubricant mixture out of the bearing assembly 400 and into the bearing compartment 120, and causes the flow to happen more uniformly around the circumference of the bearing cage 402 and the outer race 408, reducing the likelihood of localized hot spots.

Figure 10A:
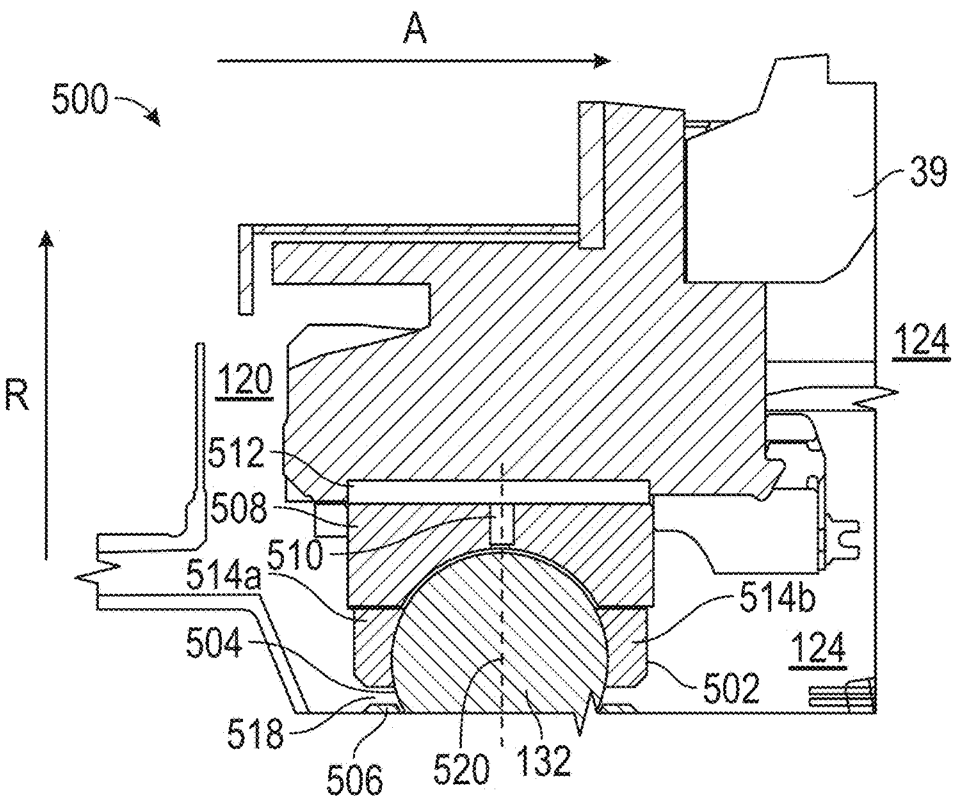
FIG. 10A is a cutaway section view of a rotary bearing assembly according to another example, including radial and axial outlet channels.
Figure 10B:
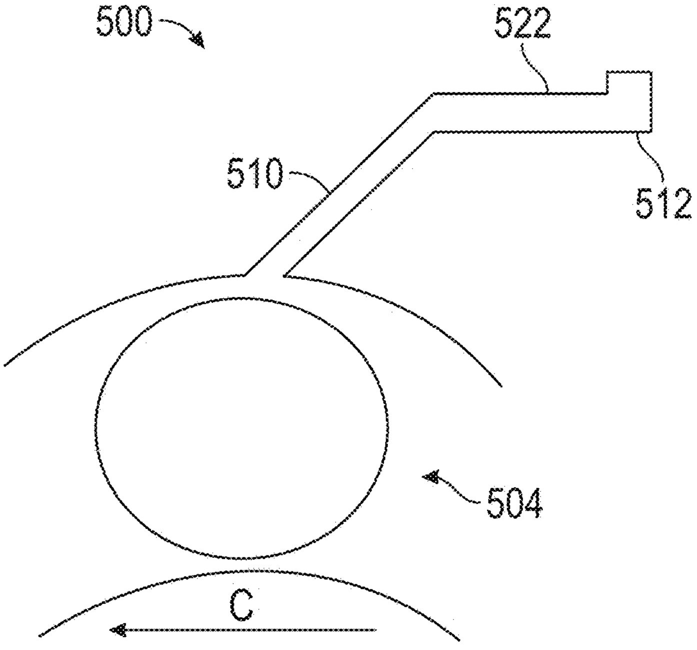
FIG. 10B is a schematic of the axial-view direction of the rotary bearing assembly of FIG. 10A.
Figure 10C:
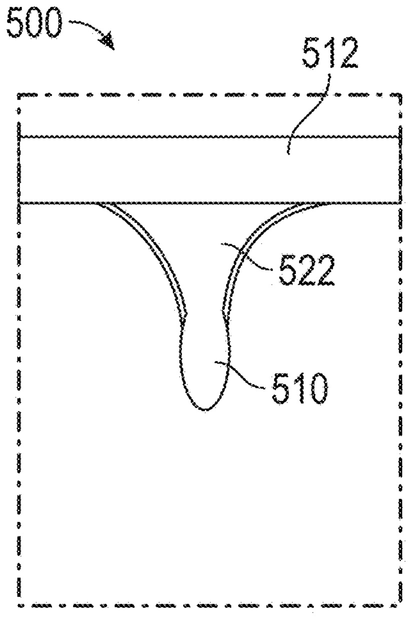
FIG. 10C is a schematic of the radial-view direction of the rotary bearing assembly of FIG. 10A.

FIG. 10A-10C show an example bearing assembly 500. The bearing assembly 500 can be identical or substantially identical to the bearing assembly 200 described herein and illustrated in FIG. 5, aside from the differences described herein. The bearing assembly 500 can function in an identical or substantially identical fashion as described above with respect to bearing assembly 200, aside from the difference described herein.

As shown in FIG. 10A, the bearing assembly 500 comprises an annular bearing cage 502 having an annular body with a first axial end portion 514*a*, a second axial end portion

514*b*, a longitudinal axis parallel to the centerline axis of the turbomachine engine (such as centerline axis 12 of turbomachine engine 10), and one or more bearing slots 504. The one or more bearing slots 504 receive one or more bearing elements, such as bearing elements 132, described in greater detail above regarding bearing assembly 118 (and as illustrated in FIGS. 3A and 4). The bearing cage 502 and the bearing elements 132 sit between an inner race 506, also referred to herein as a first race, and an outer race 508, also referred to herein as a second race, as described above in relation to the bearing assembly 118, with the bearing elements 132 in simultaneous contact with the inner race 506 and the outer race 508.

The outer race 508 can be coupled to the fixed engine housing 39 or disposed between the fixed engine housing 39 and the inner race 506. The inner race 506 can be statically coupled to the rotating shaft 31 (as shown in FIG. 3A). As described in greater detail above, lubricant is introduced to the bearing cage 502 from the bearing compartment 120 (FIG. 3A), and provides lubrication between the bearing elements 132, the inner race 506, the bearing cage 502, and the outer race 508.

The bearing assembly 500 can also include a radial gap 518 between the bearing cage 502 and either the inner race 506 or the outer race 508. For example, as shown in FIG. 10A, the radial gap 518 can be positioned between the bearing cage 502 and the inner race 506, such that the bearing cage 502 is adjacent to and rotates along the inner race 506. In this way, the bearing slots 504 can be opened to the chambers of the turbomachine engine 10 (FIG. 1) (such as the bearing compartment 120, shown in FIG. 3A), allowing lubricant to exit the bearing assembly 500 through the radial gap 518. While FIG. 10A shows the radial gap 518 disposed between the bearing cage 502 and the inner race 506, it is to be understood that the radial gap 518 may alternatively be positioned between the bearing cage 502 and the outer race 506, such that the bearing cage 502 is adjacent to and rotates along the inner race 506.

As shown in FIG. 10A, the outer race 508 can further comprise a radial channel 510, and an axial channel 512, also referred to herein as a second channel. The channels 510, 512 comprise a lubricant outlet, which decreases lubricant dwell time and increases lubricant flow rate through the bearing assembly 500. The radial channels 510 can extend radially outwards from the bearing slot 504 and terminate at a corresponding axial channel 512.

As best shown in FIG. 10A, the axial channels 512 extend axially from a centerline axis 520 of the outer race 508 towards an axial end portion 514*a*, 514*b* of the outer race 508. In the example illustrated in FIG. 10A, the axial channels 512 can extend from the centerline axis 520 to the second axial end portion 514*b* of the outer race 508, but it is to be appreciated that the axial channels 512 can extend from the centerline axis 520 to the first axial end portion 514*a*. In some examples, the axial channels 512 can also extend circumferentially along the diameter of the outer race 508. The passage formed by the radial channels 510 and the axial channels 512 allows for fluid communication between the bearing compartment 120 or the pressurized compartment 124 (FIG. 3A) and the bearing slots 504.

Because air can flow into the bearing slot 504 through the radial gap 518, for the same reasons discussed above with respect to the bearing assembly 200, this configuration of the bearing assembly 500 ensures that the air-lubricant mixture will be expelled radially from the bearing cage 502 and into the radial channels 510. As the air-lubricant mixture is expelled through the radial channels 510, it flows radially into the axial channels 512, axially through the axial channels 512 and into the bearing compartment 120 and/or the pressurized compartment 124. Thus, heated lubricant can be returned to the bearing compartment 120 and/or the pressurized compartment 124 from the bearing cage 302.

In some examples, such as that illustrated in FIGS. 10B and 10C, the radial channel 510 can extend circumferentially as well as axially. Additionally, the axial channel 512 can further comprise a circumferentially extending trough 522. In such examples, as the bearing cage 502 and the bearing elements 132 rotate in the circumferential direction indicated by arrow C in FIG. 10B, the circumferential extension of the channels 510, 512 and the trough 522 allows the air-lubricant mixture to be centrifugally expelled from the bearing cage 502. Such examples may facilitate the exchange of lubricant between the bearing cage 502 and the bearing compartment 120 and/or the pressurized compartment 124.

As shown in FIG. 10A, the radial channel 510 and the axial channel 512 can be formed in the outer race 508, such that the radial channel 510 and the axial channel 512 can interconnect with no gap or interruption.

While FIGS. 10A-10C show a bearing assembly 500 having a single radial channel 510 and axial channel 512, it is to be understood that the bearing assembly 500 may include additional pairs of radial channels 510 and axial channels 512. These additional pairs of channels 510, 512 can be circumferentially spaced along the outer race 508. Advantageously, this facilitates a uniform expulsion of the air-lubricant mixture across the entire circumference of the bearing cage 502, and reduces the localized generation of heated spots.

Figure 11:
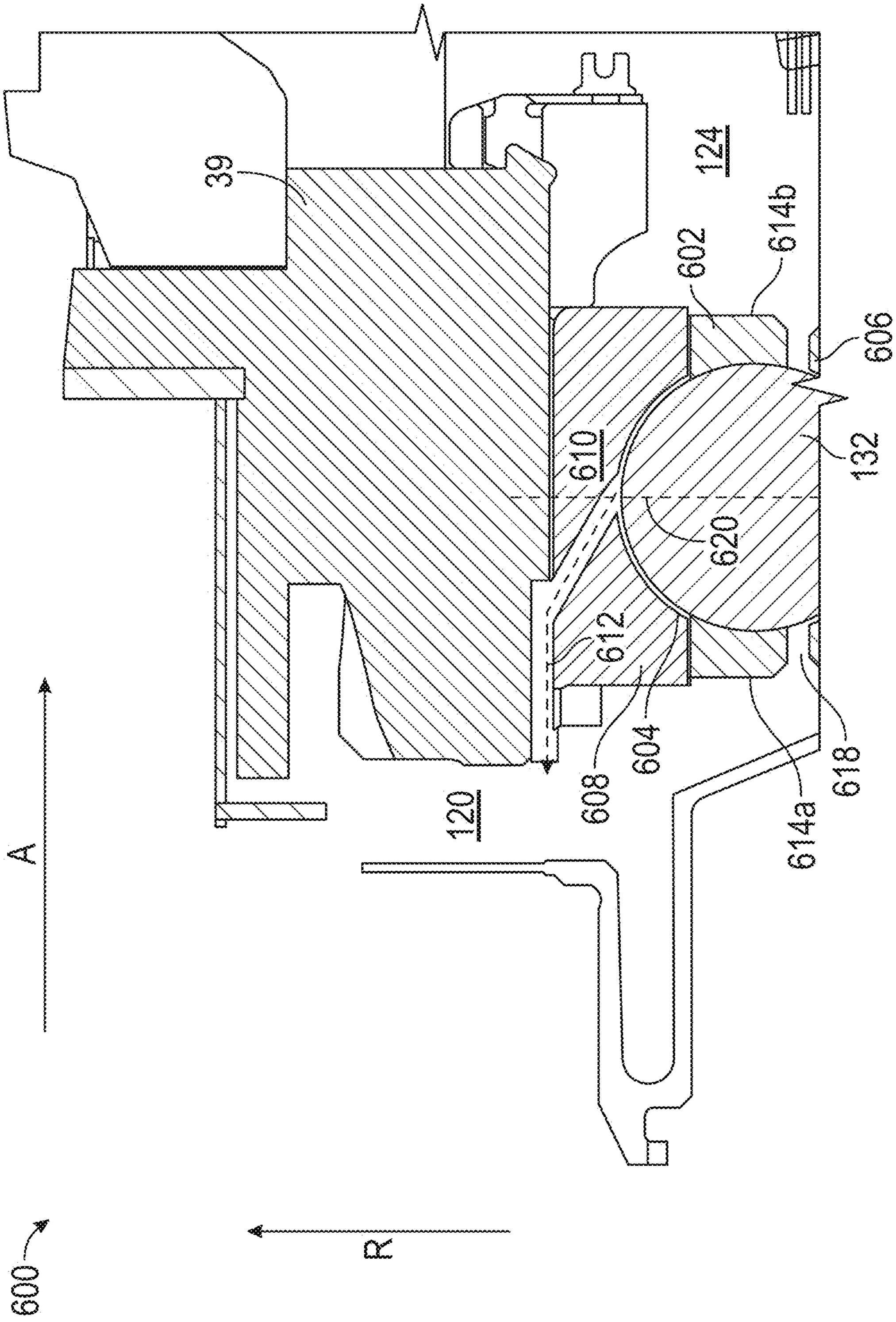
FIG. 11 is a cutaway section view of a rotary bearing assembly according to another example, including radial and axial outlet channels.

FIG. 11 shows an example bearing assembly 600. The bearing assembly 600 can be identical or substantially identical to the bearing assembly 500 described herein and illustrated in FIGS. 10A and 10B, aside from the differences described herein. The bearing assembly 600 can function in an identical or substantially identical fashion as described above with respect to bearing assembly 500, aside from the difference described herein.

As shown in FIG. 11, the bearing assembly 600 comprises an annular bearing cage 602 having an annular body with a first axial end portion 614*a*, a second axial end portion 614*b*, a longitudinal axis parallel to the centerline axis of the turbomachine engine (such as centerline axis 12 of turbomachine engine 10), and one or more bearing slots 604. The one or more bearing slots 604 receive one or more bearing elements, such as bearing elements 132, described in greater detail above regarding bearing assembly 118 (and as illustrated in FIGS. 3A and 4). The bearing cage 602 and the bearing elements 132 sit between an inner race 606, also referred to herein as a first race, and an outer race 608, also referred to herein as a second race, as described above in relation to the bearing assembly 118, with the bearing elements 132 in simultaneous contact with the inner race 606 and the outer race 608.

The outer race 608 can be coupled to the fixed engine housing 39 or disposed between the fixed engine housing 39 and the inner race 606. The inner race 606 can be statically coupled to the rotating shaft 31 (as shown in FIG. 3A). As described in greater detail above, lubricant is introduced to the bearing cage 602 from the bearing compartment 120 (FIG. 3A), and provides lubrication between the bearing elements 132, the inner race 606, the bearing cage 602, and the outer race 608.

The bearing assembly 600 can also include a radial gap 618 between the bearing cage 602 and either the inner race 606 or the outer race 608. For example, as shown in FIG. 11, the radial gap 618 can be positioned between the bearing cage 602 and the inner race 606, such that the bearing cage 602 is adjacent to and rotates along the inner race 606. In this way, the bearing slots 604 can be opened to the chambers of the turbomachine engine 10 (FIG. 1) (such as the bearing compartment 120, shown in FIG. 3A), allowing lubricant to exit the bearing assembly 600 through the radial gap 618. While FIG. 11 shows the radial gap 618 disposed between the bearing cage 602 and the inner race 606, it is to be understood that the radial gap 618 may also be positioned between the bearing cage 602 and the outer race 608, such that the bearing cage 602 is adjacent to and rotates along the inner race 606.

With continued reference to FIG. 11, the bearing assembly 600 can include a radial channel 610 located in the outer race 608. As shown in FIG. 11, the radial channel 610 can extend from the bearing slots 604 to an axial channel 612. The radial channel 610 can have an axial inclination away from a centerline 620 of the bearing assembly 600 and towards the bearing compartment 120. The radial channels 610 can extend to the axial channel 612 formed in the static housing 39, wherein the axial channel 612 connects the radial channel 610 to the bearing compartment 120. As described above in relation to the bearing assembly 500, and shown in FIGS. 10A-10C, the rotational movement of the bearing cage 602 and the bearing elements 132 causes air and lubricant to be taken into the bearing cage 602, and particularly the bearing slots 604, where they mix to form an air-lubricant mixture. The rotation of the bearing cage 602 and the bearing elements 132 causes the air-lubricant mixture to be centrifugally expelled through the radial channel 610, through the axial channel 612 and into the bearing compartment 120.

In some examples, such as that shown in FIG. 11, the axial channel 612 can be formed as a groove in the static housing 39. The groove in the static housing 39 can extend circumferentially around the full circumference of the static housing. In some examples, this allows multiple radial channels 610 to be simultaneously in communication with the axial channel 612, which may improve the uniform flow of air-lubricant mixture from the bearing slots 604 through the channels 610, 612 and into the bearing compartment 120, and thus also improve the uniformity of the cooling effect of the air-lubricant mixture flow.

Figure 12B:
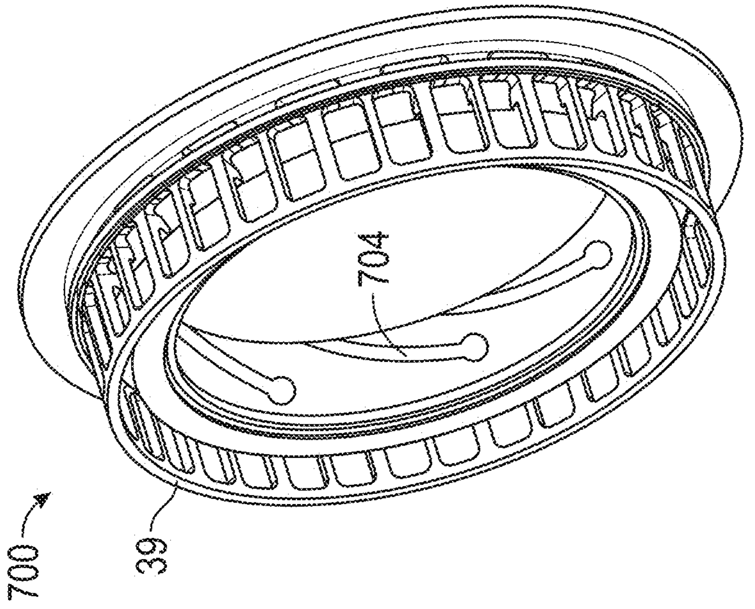
FIG. 12B is a perspective view of the housing component shown in FIG. 12A.
Figure 12A:
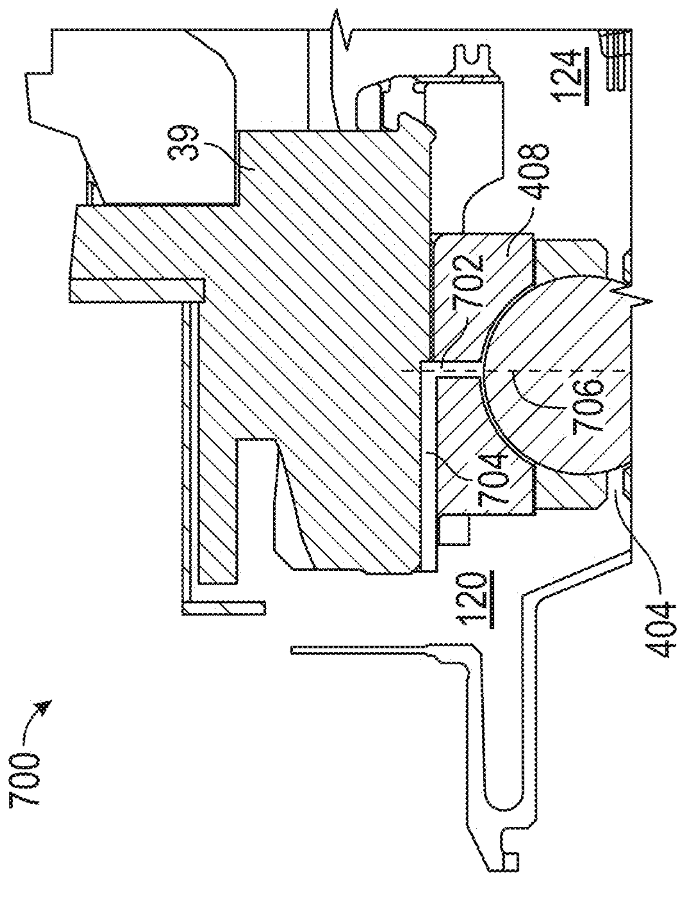
FIG. 12A is a cutaway section view of a rotary bearing assembly according to another example, including radial and axial outlet channels.

FIGS. 12A-12B show an example bearing assembly 700. The bearing assembly 700 can be identical or substantially identical to the bearing assembly 400 described herein and illustrated in FIGS. 9A-9C, aside from the differences described herein. The bearing assembly 700 can function in an identical or substantially identical fashion as described above with respect to bearing assembly 400, aside from the differences described herein.

Specifically, the example bearing assembly 700 omits the annular groove 414 that connects the radial channels 410 and the axial channels 412. In lieu of the radial channels 410, the axial channels 412, and the annular groove 414 illustrated in FIGS. 9A-9C, the bearing assembly 700 instead comprises a plurality of radial channels 702 that extend radially from the bearing slots 404 through the outer race 408 and to the fixed engine housing 39. The fixed engine housing 39 includes a plurality of axially and circumferentially extending channels 704, that extend from a point aligned with a centerline 706 of the outer race 408. Thus, the fluid pathway from the bearing slots 404 to the bearing compartment 120 is formed entirely by the pathway through the radial channels 702 and the axial channels 704.

As shown in FIG. 12B, the plurality of axial channels 704 can be circumferentially spaced apart along an inner surface of the fixed engine housing 39. Correspondingly, the plurality of radial channels 702 can be circumferentially spaced apart along the circumference of the outer race 408, to facilitate more even heat removal from the bearing assembly 700, in a fashion similar to that described above in relation to the bearing assembly 400.

Advantageously, because the channels in all the examples previously described are formed in the bearing cage (i.e., bearing cage 202 or bearing cage 302), there are no additional design constraints imposed on either the inner race or the outer race (i.e., inner race 206 or outer race 208). Accordingly, this solution may be used with bearing assemblies of various outer diameters, even when the design parameters of the turbomachine engine impose restrictions on the bearing dimensions, such as the outer diameter of the bearing.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Further aspects of the disclosure are provided by the subject matter of the following clauses:

A turbomachine comprising a rotating shaft extending along a centerline and a fixed engine housing positioned exterior to the rotating shaft in a radial direction relative to the centerline; and a bearing assembly comprising a first race coupled to the rotating shaft and configured to rotate along with the rotating shaft and relative to the first race, a second race disposed between the first race and the fixed engine housing, a bearing cage positioned between the first race and the second race, comprising a bearing slot, and configured to rotate in the rotational direction along with the second race, and a bearing element disposed in the bearing slot; wherein the bearing cage comprises an annular body with a longitudinal axis, a first axial end portion, and a second axial end portion, wherein the bearing cage comprises a first channel extending away from the rotational direction from the first axial end portion of the bearing cage towards an axial centerline of the bearing, and a second channel extending in the rotational direction from either the first axial end portion or the second axial end portion of the bearing cage towards the axial centerline of the bearing, and wherein when the turbomachine is in an operational state, air flows through the first channel from the first axial end portion of the bearing cage to the bearing slot, and a mixture of air and lubricant flows through the second channel from the bearing slot to the second axial end portion of the bearing cage.

The turbomachine of the preceding clause, wherein one of bearing cage, the first race, or the second race comprises a lubricant inlet configured to admit a lubricant to the bearing cage when the turbomachine is in the operational state.

The turbomachine of any preceding clause, wherein the first channel extends from the first axial end portion of the bearing cage to the bearing slot and the second channel extends from the bearing slot to the second axial end portion of the bearing cage.

The turbomachine of any preceding clause, wherein the air from the first channel causes turbulence within the bearing slot.

The turbomachine of any preceding clause, wherein the air from the first channel is mixed with a lubricant in the bearing slot to form the mixture of air and lubricant when the turbomachine is in an operational state.

The turbomachine of any preceding clause, wherein one of the first channel or the second channel extend through the bearing cage in a radial direction.

The turbomachine of any preceding clause, wherein the first channel is angled relative to the axial centerline of the bearing cage.

The turbomachine of any preceding clause, wherein the angle between the first channel and the axial centerline of the bearing cage is between 10° and 80°.

The turbomachine of any preceding clause, wherein the angle between the first channel and the axial centerline of the bearing cage is between 30° and 60°.

The turbomachine of any preceding clause, wherein the bearing assembly further comprises a radial gap between the first race and the bearing cage.

The turbomachine of any preceding clause, wherein the bearing assembly further comprises a radial gap between the second race and the bearing cage.

The turbomachine of any preceding clause, wherein the first channel extends from the first axial end portion or the second axial end portion to the radial gap.

The turbomachine of any preceding clause, wherein when the turbomachine is in the operational state, the first channel directs air to an inner diameter of the bearing cage.

The turbomachine of any preceding clause, wherein when the turbomachine is in the operational state, the first channel directs air to an outer diameter of the bearing cage.

The turbomachine of any preceding clause, wherein the first channel extends through the bearing cage in a radial direction from a radial interior of the bearing cage to the bearing slot.

The turbomachine of any preceding clause, wherein the second channel extends through the bearing cage in a radial direction from the bearing slot to a radial exterior of the bearing cage.

The turbomachine of any preceding clause, wherein the bearing cage comprises a plurality of second channels, circumferentially spaced along the bearing cage.

The turbomachine of any preceding clause, wherein the plurality of second channels is arranged in pairs, and each pair of second channels extends from a corresponding bearing slot to the first and second axial end portions of the bearing cage.

The turbomachine of any preceding clause, wherein the plurality of second channels is spaced circumferentially on the bearing cage, and wherein each second channel extends from one of the first axial end portion or the second axial end portion of the bearing cage to the bearing slot.

The turbomachine of any preceding clause, wherein the plurality of second channels is spaced circumferentially on the bearing cage, and wherein some second channels of the plurality of second channels extends from the first axial end portion to the bearing slot and the remaining channels of the plurality of second channels extends from the second axial end portion to the bearing slot.

The turbomachine of any preceding clause, wherein the bearing element is a ball bearing.

The turbomachine any preceding clause, wherein the bearing element is a roller bearing.

The turbomachine any preceding clause, wherein the second race is statically coupled to the fixed engine housing.

The turbomachine any preceding clause, wherein the second race is rotationally coupled to the first race and the fixed engine housing and rotates at a different speed than the rotating shaft when the turbomachine is in an operational state.

The turbomachine of any preceding clause, wherein the plurality of second channels is spaced circumferentially on the bearing cage, and wherein a portion of the second channels of the plurality of second channels extend from the first axial end portion to the bearing slot and a remaining portion of the channels of the plurality of second channels extend from the second axial end portion to the bearing slot.

The turbomachine of any preceding clause, wherein the first channel extends axially through the bearing cage from the first axial end portion to the bearing slot, and the second channel extends axially through the bearing cage from the bearing slot to the second axial end portion.

The turbomachine of any preceding clause, wherein the first channel extends axially through the bearing cage from the first axial end portion to the bearing slot, and the second channel extends axially through the bearing cage from the bearing slot to the first axial end portion.

A method of cooling a bearing assembly, wherein the bearing assembly includes a first race, a second race, a bearing cage, a bearing element disposed within the bearing cage, a first channel extending through the bearing cage, and a second channel extending through the bearing cage, the method comprising rotating the second race and the bearing cage in a first rotational direction, introducing a lubricant to the bearing assembly, introducing air to the bearing assembly through the first channel to induce turbulent mixing of the lubricant and the air to form a mixture of lubricant and air, and expelling the mixture of lubricant and air through the second channel; wherein the bearing cage comprises a first axial end portion, a second axial end portion, and an annular body extending between the first axial end portion and the second axial end portion, wherein the first channel extends against the rotational direction from the first axial end portion of the bearing cage towards an axial centerline of the bearing cage, wherein the second channel extends in the rotational direction from the second axial end portion of the bearing cage towards an axial centerline of the bearing cage.

The method of the preceding clause, wherein the bearing cage comprises a plurality of first channels extends from the first axial end portion to a bearing slot in the bearing cage, a plurality of second channels extending from the bearing slot to either the first axial end portion or the second axial end portion of the bearing cage, wherein each first channel is arranged with a corresponding second channel to form a pair of channels.

The method of any preceding clause, wherein the air is introduced from the first channel to an inner diameter of the bearing cage.

The method of any preceding clause, wherein the air is introduced from the first channel to a bearing slot in the bearing cage, and wherein the bearing slot is configured to receive a bearing element.

The method of any preceding clause, wherein air is introduced from the first channel to an outer diameter of the bearing cage.

The method of any preceding clause, wherein rotating the bearing cage causes air to flow through the first channel to the bearing assembly and a mixture of lubricant and air to flow through the second channel out of the bearing assembly.

The method of any preceding clause, wherein the air introduced through the first channel flows radially outwards through the bearing cage and the air and lubricant mixture flows radially outwards through the second channel.

A bearing assembly for a turbomachine, the turbomachine including a rotating shaft extending along a centerline axis and a fixed housing positioned exterior to the rotating shaft in a radial direction relative to the centerline axis, the bearing assembly comprising a first race statically coupled to the rotating shaft, a bearing cage having a first axial end portion, a second axial end portion, and an annular body extending between the first axial end portion and the second axial end portion, wherein the bearing cage is disposed between the first race and the second race, a bearing element disposed within the bearing cage and extending between the first race and the second race, and a first channel extending from an axial end portion towards the centerline axis of the bearing cage and a second channel extending from the centerline axis of the bearing cage to an axial end portion of the bearing cage, wherein the first channel and the second channel extend radially through the bearing cage; and wherein when the turbomachine is in an operational state, air flows radially outwards through the first channel and a mixture of air and lubricant flows radially outwards through the second channel.

The bearing assembly of the preceding clause, wherein the bearing assembly comprises a plurality of first and second channels and wherein when the turbomachine is in an operational state, air is introduced to the bearing assembly through each first channel, and a mixture of air and lubricant is removed from the bearing assembly through each second channel.

The bearing assembly of any preceding clause, further comprising a radial gap disposed between the first race and the bearing cage.

The bearing assembly of any preceding clause, further comprising a radial gap disposed between the second race and the bearing cage.

The bearing assembly of any preceding clause, wherein the second race is statically coupled to the fixed engine housing.

The bearing assembly of any preceding clause, wherein the second race is rotationally coupled to the first race and the fixed engine housing and rotates at a different speed than the rotating shaft when the turbomachine is in an operational state.

The bearing assembly of any preceding clause, wherein the first channel or the second channel has a varying cross section.

The bearing assembly of any preceding clause, wherein the first channel or the second channel is curved along the length.

The bearing assembly of any preceding clause, wherein the first channel or the second channel has a counter-sunk inlet and/or outlet.

The bearing assembly of any preceding clause, wherein the first channel or the second channel extends with a circumferential and a radial component from the bearing cage.

The bearing assembly of any preceding clause, wherein the first channel is offset from a tangent drawn from the bearing cage with a radial angle.

The bearing assembly of any preceding clause, wherein the radial angle is between 10° and 80°.

The bearing assembly of any preceding clause, wherein the radial angle is between 30° and 80°.

A turbomachine comprising: a rotating shaft extending along a centerline axis and a fixed engine housing positioned exterior to the rotating shaft in a radial direction relative to the centerline axis; and a bearing assembly comprising: a first race coupled to the rotating shaft that rotates along with the rotating shaft in a first rotational direction when the turbomachine is in an operational state; a second race disposed between the first race and the fixed engine housing, an annular bearing cage positioned between the first race and the second race, comprising a bearing slot, and configured to rotate relative to the first race and the second race; a radial gap between the bearing cage and the second race; a first channel extending radially through the second race and a second channel extending axially through the fixed engine housing to a bearing compartment; and at least one bearing element disposed in the bearing slot; wherein when the turbomachine is in the operational state, air flows through the radial gap to the bearing slot and a mixture of air and lubricant flows through the first channel and the second channel away from the bearing slot and to the bearing compartment. The bearing assembly of any preceding clause, wherein the first channel is formed entirely within the first race or the second race.

The bearing assembly of any preceding clause, wherein the first channel is formed least partially disposed within the fixed engine housing.

The bearing assembly of any preceding clause, wherein the second channel is at formed in the first race or the second race.

The bearing assembly of any preceding clause, wherein the second channel is formed in the fixed engine housing.

The bearing assembly of any preceding clause, wherein the first race comprises a circumferential trough connecting one or more channels.

The bearing assembly of any preceding clause, wherein the fixed engine housing comprises a circumferential trough connecting one or more channels.

In view of the many possible embodiments to which the principles of the disclosure may be applied, it should be recognized that the illustrated embodiments are only preferred examples of the disclosure and should not be taken as limiting the scope of the disclosure. Rather, the scope of the disclosure is defined by the following claims and clauses.

The invention claimed is:

1. A turbomachine comprising:

a rotating shaft extending along a centerline axis and a fixed engine housing positioned exterior to the rotating shaft in a radial direction relative to the centerline axis; and a bearing assembly comprising:

a first race coupled to the rotating shaft that rotates along with the rotating shaft in a first rotational direction when the turbomachine is in an operational state;

a second race disposed between the first race and the fixed engine housing, an annular bearing cage positioned between the first race and the second race, comprising a bearing slot, and configured to rotate relative to the first race and the second race; and at least one bearing element disposed in the bearing slot;

wherein the bearing cage comprises a first axial end portion, and a second axial end portion, wherein the bearing cage comprises a first channel extending through the bearing cage in the first rotational direction angled towards the bearing slot with an inlet end of the first channel at the first axial end portion being arranged forward of an outlet end of the first channel at the bearing slot, and a second channel extending through the bearing cage in the first rotational direction angled away from the bearing slot with an inlet end of the second channel at the bearing slot being arranged forward of an outlet end of the second channel at the second axial end portion, and wherein when the turbomachine is in the operational state, air flows through the first channel to the bearing slot, and a mixture of air and lubricant flows through the second channel away from the bearing slot.

2. The turbomachine of claim 1, wherein one of the bearing cage, the first race, or the second race comprises a lubricant inlet configured to admit a lubricant to the bearing cage when the turbomachine is in the operational state.

3. The turbomachine of claim 1, wherein the first channel extends from the first axial end portion of the bearing cage to the bearing slot and the second channel extends from the bearing slot to the second axial end portion of the bearing cage.

4. The turbomachine of claim 1, wherein the air from the first channel is mixed with a lubricant in the bearing slot to form the mixture of air and lubricant when the turbomachine is in the operational state.

5. The turbomachine of claim 1, wherein the bearing assembly further comprises a radial gap between the first race and the bearing cage, or between the second race and the bearing cage.

6. The turbomachine of claim 1, wherein when the turbomachine is in the operational state, the first channel directs air to the bearing slot.

7. The turbomachine of claim 1, wherein the bearing cage comprises a plurality of second channels, circumferentially spaced along the bearing cage.

* * * * *